US012195041B2

(12) United States Patent
Kassar et al.

(10) Patent No.: US 12,195,041 B2
(45) Date of Patent: Jan. 14, 2025

(54) SYSTEMS AND METHODS FOR BIASING A TRAJECTORY OF AN AUTONOMOUS VEHICLE WHILE MOVING IN A LANE

(71) Applicant: FORD GLOBAL TECHNOLOGIES, LLC, Pittsburgh, PA (US)

(72) Inventors: Alice Kassar, Detroit, MI (US); Ramadev Burigsay Hukkeri, Pittsburgh, PA (US)

(73) Assignee: Ford Global Technologies, LLC, Dearborn, MI (US)

( * ) Notice: Subject to any disclaimer, the term of this patent is extended or adjusted under 35 U.S.C. 154(b) by 278 days.

(21) Appl. No.: 17/664,087

(22) Filed: May 19, 2022

(65) Prior Publication Data
US 2023/0373523 A1 Nov. 23, 2023

(51) Int. Cl.
*B60W 40/06* (2012.01)
*B60W 60/00* (2020.01)
(52) U.S. Cl.
CPC ........ *B60W 60/0011* (2020.02); *B60W 40/06* (2013.01); *B60W 2552/05* (2020.02); *B60W 2554/80* (2020.02)
(58) Field of Classification Search
CPC .. B60W 30/12; B60W 40/06; B60W 60/0011; B60W 2552/05; B60W 2552/10; B60W 2552/30; B60W 2552/53; B60W 2554/80
See application file for complete search history.

(56) References Cited

U.S. PATENT DOCUMENTS

| 2014/0200801 | A1* | 7/2014 | Tsuruta | B60W 60/001 |
| | | | | 701/400 |
| 2017/0301239 | A1* | 10/2017 | Lee | B60W 30/0956 |
| 2019/0359202 | A1* | 11/2019 | Zhu | B60W 10/04 |
| 2020/0398894 | A1* | 12/2020 | Hudecek | G05D 1/0214 |
| 2021/0122373 | A1* | 4/2021 | Dax | B60W 60/0011 |

(Continued)

FOREIGN PATENT DOCUMENTS

| CN | 113495551 A | 10/2021 |
| JP | 2017058859 A | 3/2017 |
| WO | 2021086781 A1 | 5/2021 |

OTHER PUBLICATIONS

International Search Report and Written Opinion in corresponding international application No. PCT/US2023/022764, mailed Aug. 30, 2023, 10 pages.

(Continued)

*Primary Examiner* — Joseph C Rodriguez
(74) *Attorney, Agent, or Firm* — Frank A. MacKenzie; Brooks Kushman, P.C.

(57) ABSTRACT

Disclosed herein are systems, methods, and computer program products for biasing a trajectory of a vehicle. The methods comprise: identifying a lane biasing interval of a lane in which the vehicle is to travel based on a lane width; obtaining a first reference path of travel for the vehicle that passes through the lane biasing interval; generating a second reference path of travel for the vehicle using a plurality of lateral offsets and the first reference path of travel for the vehicle; and adjusting the trajectory of the vehicle using the second reference path of travel. The lateral offsets are based on a lateral offset from each index point of the first reference path that resides in the lane biasing interval.

19 Claims, 18 Drawing Sheets

(56) References Cited

U.S. PATENT DOCUMENTS

2021/0163010 A1* 6/2021 Takabayashi ............ G08G 1/16
2022/0144266 A1* 5/2022 Sachdev ......... B60W 30/18163
2023/0182731 A1* 6/2023 Ishikawa ......... B60W 30/18154
  701/93

OTHER PUBLICATIONS

Wei, J. et al., A Behavioral Planning Framework for Autonomous Driving, 2014.
Ward, E., Models Supporting Trajectory Planning in Autonomous Vehicles, KTH Computer Science and Communication, Doctoral Thesis, Stockholm, Sweden, 2018.

* cited by examiner

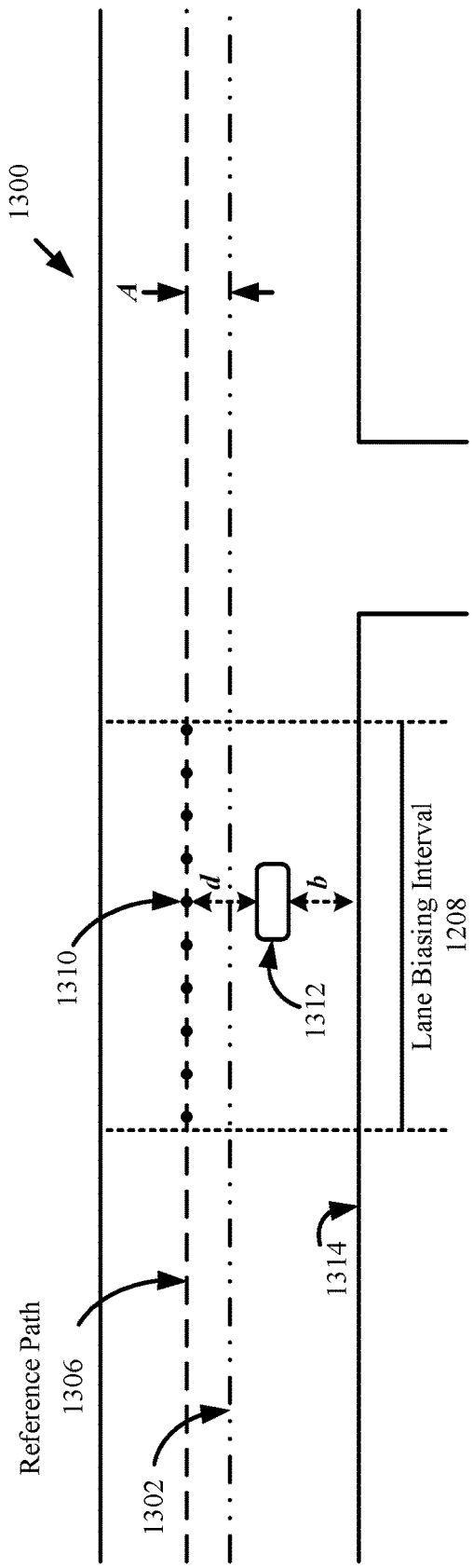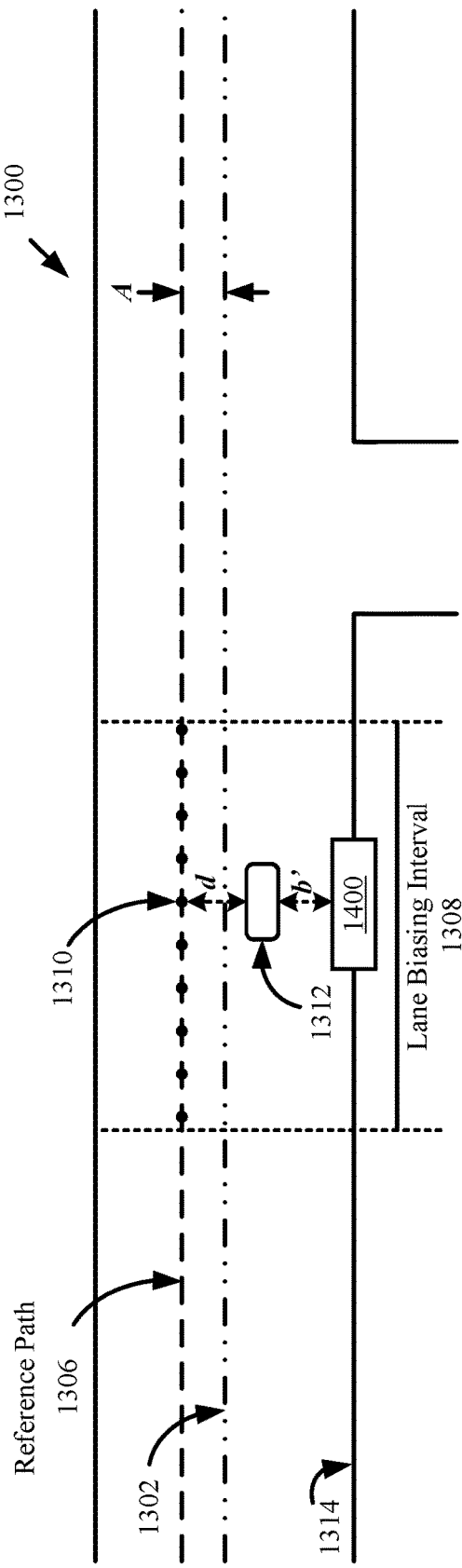

SYSTEMS AND METHODS FOR BIASING A TRAJECTORY OF AN AUTONOMOUS VEHICLE WHILE MOVING IN A LANE

BACKGROUND

Modern day vehicles have at least one on-board computer and have internet/satellite connectivity. The software running on these on-board computers monitor and/or control operations of the vehicles. The vehicle also comprises monocular or stereo cameras and/or lidar detectors for detecting objects in proximity thereto. The cameras capture images of a scene. The lidar detectors generate lidar datasets that measure the distance from the vehicle to an object at a plurality of different times. These images and distance measurements can be used for detecting and tracking movements of the object, making predictions as to the object's trajectory, and planning paths of travel for the vehicle based on the predicted objects trajectory. When traversing roads, the vehicle should yield to objects (for example, pedestrians and other animals) that intend to cross the same.

In wide lane traffic, patterns emerge where vehicles typically travel adjacent to each other, converting a one-lane road into a pseudo two-lane road. That is, between the painted lane marks, vehicles may travel adjacent to each other or may bias to a certain side because of future actions creating pseudo-lanes. Object trajectory prediction does not have knowledge as to how a vehicle may bias itself in a lane.

This document describes methods and systems that are directed to addressing the problems described above, and/or other issues.

SUMMARY

The present disclosure concerns implementing systems and methods for biasing a trajectory of a vehicle. The methods comprise: identifying a lane biasing interval of a lane in which the vehicle is to travel based on a lane width; obtaining a first reference path of travel for the vehicle that passes through the lane biasing interval; generating a second reference path of travel for the vehicle using a plurality of lateral offsets and the first reference path of travel for the vehicle; adjusting the trajectory of the vehicle using the second reference path of travel; and/or causing the vehicle to follow the trajectory which has been adjusted. The lateral offsets are based on a lateral offset from each index point of the first reference path that resides in the lane biasing interval.

The implementing systems can comprise: a processor; and a non-transitory computer-readable storage medium comprising programming instructions that are configured to cause the processor to implement a method for operating an automated system. The above-described methods can also be implemented by a computer program product comprising memory and programming instructions that are configured to cause a processor to perform operations.

BRIEF DESCRIPTION OF THE DRAWINGS

The accompanying drawings are incorporated herein and form a part of the specification.

FIG. 13 provides an illustration that is useful for understanding reference paths and lateral offset computations.

FIG. 14 provides an illustration that is useful for understanding how desired lateral offsets may be adjusted when obstacle(s) exist.

In the drawings, like reference numbers generally indicate identical or similar elements. Additionally, generally, the leftmost digit(s) of a reference number identifies the drawing in which the reference number first appears.

DETAILED DESCRIPTION

Figure 1:
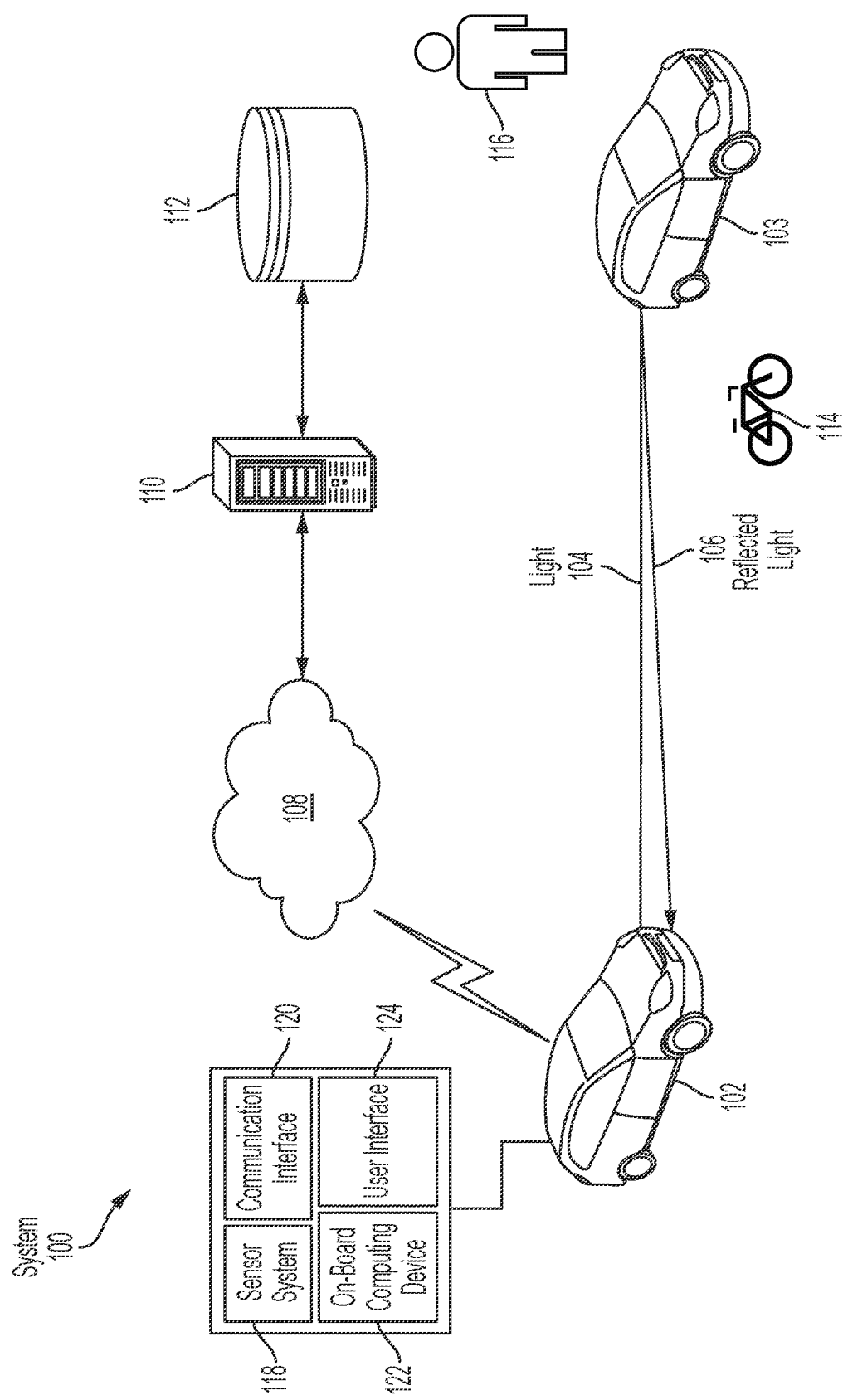
FIG. 1 is an illustration of an illustrative system.

As noted above, vehicles may travel adjacent to each other in wide lanes, converting a one-lane road into a pseudo two-lane road. That is, between the painted lane marks, vehicles may travel adjacent to each other or may bias to a certain side of the lane because of future actions (e.g., turning, traveling on one of two roads after a lane spit, etc.) creating pseudo-lanes. Object trajectory prediction does not have knowledge as to how a vehicle may bias itself in a lane. This document describes methods and systems that are directed to addressing this issue. The present solution provides a technique which improves lane biasing in wide lanes to promote naturalistic driving by vehicles.

The present solution generally concerns implementing systems and methods for biasing a trajectory of a vehicle while moving in a lane. The methods can be performed at least partially by an on-board computing device of the vehicle. The methods involve: obtaining sensor data generated by sensor(s) of the vehicle; obtaining map data specifying lanes and lane features; and optionally obtaining intent data specifying an intent of the vehicle to travel straight in a given lane, to turn right at a given intersection, to turn left at the given intersection, to travel in particular lane(s), to travel on particular side(s) of lane(s) (for example, center, left or right side of a lane), and/or to travel in particular lane(s) after lane split(s). The vehicle's intent can be obtained using any known or to be known technique. For example, the vehicle's intent can be obtained using a path of travel from a start location to a destination location and/or based on lane information contained in the map data. If the vehicle intent is not clear, then an assumption may be made by the system that the vehicle will stay in a right-side of the lane.

The sensor, map, and/or intent data is(are) used to identify a lane biasing interval in which a lane bias should be performed based on lane width. The lane biasing should be performed for lanes classified as wide lanes and not for lanes classified as narrow lanes. The lane biasing interval is part of a wide lane prior to a turn, a lane split or a lane width variation (for example, a narrowing of the lane). The lane biasing interval can have a predefined length and an end located adjacent to or a pre-defined distance from a start of turn, a start of a corner interval, a start of a lane split or a start of a lane width variation.

A lane is classified as a wide lane when a portion of the lane in the lane biasing interval has a width equal to or greater than a threshold width (for example, twice the width of the vehicle). The lane biasing interval has: (i) a length set to a calibration parameter; (ii) an end located a calibratable distance from a start of a turn defined by corner constraints, a start of a width change in the lane or a start of a lane split; (iii) a pre-lane biasing interval in which a lateral offset is set to zero or a small value; and (iv) a post-lane biasing interval in which a lateral offset weight is set to zero or a small value. The lengths of the pre-lane biasing interval and the post-lane biasing interval are selected in accordance with a given application (for example, set to pre-defined lengths). The lane biasing interval may be modified, for example shortened or lengthened, based on a road geometry. For example, a lane biasing interval is modified to include the portion of the lane which is wide or has an increasing width. The present solution is not limited to the particulars of this example. The meaning of lateral offset will become evident as the discussion progresses.

A lane is classified as a narrow lane when (i) the lane has a constant width that is less than a threshold width or (ii) the lane has a variable width in which a ratio of the widest portion of the lane to the narrowest portion of the lane is less than or equal to a threshold value (for example, ≤0.5). For example, if the lane becomes 50% narrower than its widest point, then the lane is classified as a narrow lane. The present solution is not limited to the particulars of this example.

Next, the system calculates a lateral offset from each index point of a reference path of travel for the vehicle through the lane biasing interval. The reference path may be generated using the map data or may be predefined by the map data. For example, a reference path is generated or defined as a path that extends along or adjacent to a center of a lane that the vehicle is to travel in. The reference path may at least partially overlap, be horizontally aligned with, or be offset from the center of the lane depending on a given application. The present solution is not limited in this regard. The reference path may be defined by a plurality of connected index points. Each index point corresponds to a given location along the path of travel for the vehicle. A lateral offset corresponds to a distance (for example, distance d in FIG. 13) between an index point (for example, index point 1310 of FIG. 13) of the reference path (for example, reference path 1306 of FIG. 13) and a buffer object (for example, buffer object 1312 of FIG. 13) residing a buffered distance (for example, buffered distance d of FIG. 13) from an inside boundary (for example, boundary mark/line 1314 of FIG. 13) of the lane (for example, lane 1300 of FIG. 13).

The system calculates desired lateral offsets for the vehicle from the reference path. This computation is different for turn scenarios and lane split/variable lane width scenarios (for example, lane narrowing scenarios), each of which will be discussed in turn below.

Turn Scenarios

For turn scenarios, the system calculates desired lateral offsets which each correspond to a distance (for example, distance d in FIG. 13) between an index point (for example, index point 1310 of FIG. 13) of the reference path (for example, reference path 1306 of FIG. 13) and a buffer object (for example, buffer object 1312 of FIG. 13) residing a buffered distance (for example, buffered distance d of FIG. 13) from an inside boundary (for example, boundary mark/line 1314 of FIG. 13) of the lane (for example, lane 1300 of FIG. 13). The buffer object represents the vehicle and the buffered distance represents a minimum distance between the vehicle and a lane boundary which provides a desired assurance that a specified degree of driving safety is met. If there is a shoulder or a bike lane prior to the turn on which the vehicle can drive, then the buffered distance will be set to zero or a value that will cause the vehicle to drive outside or on the lane boundary mark or line (for example, a negative value). Otherwise, the buffered distance is set to a value that will cause the vehicle to drive inside the lane boundary mark/line (for example, a positive value). For right-hand turns, the boundary is the right-side boundary of the lane. For left-hand turns, the boundary is the left-side boundary of the lane.

If obstacle(s) exist, the desired lateral offset may be adjusted such that the vehicle will be a buffered distance from the obstacle(s) (or stated differently such that the buffer object(s) reside buffered distance(s) from the obstacle(s)). The following obstacles may not be considered for making adjustments to the desired lateral offsets: obstacles that are on the other side of the lane biasing interval from the lane boundary of interest (for example, right-side lane boundary for right-hand turns or left-side lane boundary for left-hand turns); and obstacles that are not within a temporal horizon. This calculation may be ignored when the obstacle is a moving object traveling faster than a threshold speed and on the same side of the lane biasing interval as the reference path.

A final lateral offset is generated for each index point in the lane biasing interval. The final lateral offset can be generated by: selecting the desired lateral offset with the smallest value of all desired lateral offsets; and setting the final lateral offset for all index points in the lane biasing interval equal to the selected desired lateral offset. Alternatively, a ramp filter is used to filter the lateral offsets away from an end of the lane biasing interval. The ramp filter will only allow the lateral offset to become smaller moving away from the corner entrance. The slope is set to a configured parameter. Any known or to be known ramp filter can be used here.

The validity of each final lateral offset is then checked. This check may be based on the convention that any lateral offset to the left of the reference path is positive and to the right of the reference path is negative. In this case, the final lateral offset for a right-hand turn should be negative (for example, to the right side of the reference path) and for a left-hand turn should be positive (for example, to the left side of the reference path). Thus, this validity check involves comparison operations. A conclusion is made that the final lateral offset is valid when its sign is correct. A conclusion is made that the final lateral offset is invalid when its sign is incorrect. The invalid lateral offsets may be optionally discarded or modified. For example, a final lateral offset for a right-hand turn will be discarded or modified when it is positive. A final lateral offset for a left-hand turn will be discarded or modified when it is negative. The amount to which a lateral offset value is modified can be selected in accordance with a given algorithm or such that the sign of the lateral offset changes from an incorrect sign to a correct sign. The present solution is not limited to the particulars of this example.

Lane Split and Variable Lane Width Scenarios

For lane split or variable lane width scenarios (for example, narrowing lane scenarios), the desired lateral offset is calculated by: determining a distance between index points of a portion of the reference path located within the post-lane biasing interval and points on the lane bias side boundary; and determining lateral offset values that ensure the vehicle will remain at the determined distance from the lane bias side boundary throughout the lane biasing interval. The lateral offset values may be adjusted to ensure that (i) the vehicle remains a buffered distance from any obstacles and (ii) there is a smooth transition between a portion of the path with the adjusted lateral offset and the portion of the path with the unadjusted lateral offset.

Next, the system performs weight assignment operations to obtain weight values for the lateral offsets. These operations may be the same for turn scenarios, lane split scenarios and variable lane width scenarios. These operations can involve: assigning a first pre-defined weight value to lateral offset values associated with index points of the portion of the reference path which resides in the pre-lane biasing interval; assigning a second pre-defined weight value to lateral offset values associated with index points of the portion of the reference path which resides in the lane biasing interval; and assigning a third pre-defined weight value to lateral offset values associated with index points of the portion of the reference path which resides in the post-lane biasing interval.

Alternatively, the weight assignment operations can involve: identifying each sub-interval in the lane biasing interval where the final lateral offset is constant; comparing a length of the identified sub-interval to a threshold value; assigning a first weight value (e.g., a high weight value) to the final lateral offset when the length of the identified sub-interval exceeds a threshold value; and assigning a second weight value (e.g., a relatively low weight value) to the final lateral offset when the length of the sub-identified interval does not exceed the threshold value. The weight assignment operations can also involve: identifying each sub-interval in the lane biasing interval where the final lateral offsets are ramped (i.e., continuously decreasing or increasing in value); and assigning a weight value (e.g., a relatively small weight value) to the final lateral offsets that are associated with the identified sub-interval.

Subsequently, the final lateral offsets, weights and reference path are used to generate a refined reference path of travel for the vehicle. The refined reference path of travel may be used to adjust or optimize a trajectory for the vehicle. The vehicle may be caused to follow the adjusted or optimized trajectory in a real-world environment.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, semi-autonomous vehicles, manually operated vehicles, teleoperated vehicles, watercraft, aircraft, aerial drones and the like. An "autonomous vehicle" (or "AV") is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

In this document, when terms such as "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

Notably, the present solution is being described herein in the context of autonomous vehicles. However, the present solution is not limited to autonomous vehicle applications. The present solution can be used in other applications such as robotic application (for example to control movements of articulating arms) and/or system performance applications.

FIG. 1 illustrates an example system 100, in accordance with aspects of the disclosure. System 100 comprises a vehicle 102 which is caused to travel along a road in a semi-autonomous or autonomous manner. Vehicle 102 is also referred to herein as an AV 102. The AV 102 can include, but is not limited to, land vehicles (as shown in FIG. 1), aircraft, watercraft, subterrenes, spacecraft, drones and/or or an articulating arm (for example, with a gripper at a free end). As noted above, except where specifically noted this disclosure is not necessarily limited to AV embodiments, and it may include non-autonomous vehicles in some embodiments.

AV 102 is generally configured to detect objects 103, 114, 116 in proximity thereto. The objects can include, but are not limited to, a vehicle 103, a cyclist 114 (such as a rider of a bicycle, electric scooter, motorcycle, or the like) and/or a pedestrian 116.

As illustrated in FIG. 1, the AV 102 may include a sensor system 118, an on-board computing device 122, a communications interface 120, and a user interface 124. AV 102 may further include certain components (as illustrated, for example, in FIG. 2) included in vehicles, which may be controlled by the on-board computing device 122 using a variety of communication signals and/or commands, such as, for example, acceleration signals or commands, deceleration signals or commands, steering signals or commands, braking signals or commands, etc.

Figure 2:
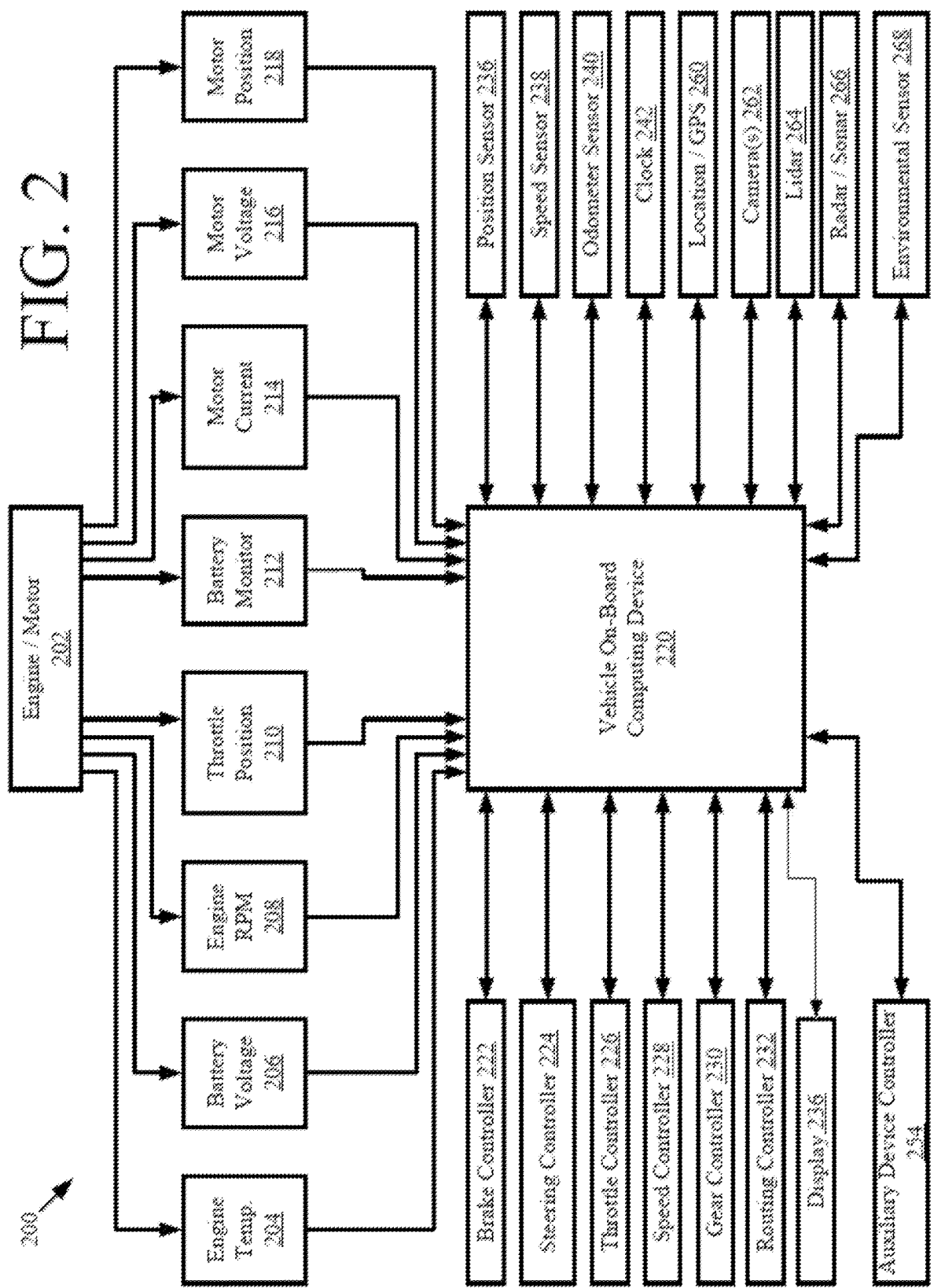
FIG. 2 is an illustration of an illustrative architecture for a vehicle.

The sensor system 118 may include one or more sensors that are coupled to and/or are included within the AV 102, as illustrated in FIG. 2. For example, such sensors may include, without limitation, a lidar system, a RADAR system, a laser detection and ranging (LADAR) system, a sound navigation and ranging (SONAR) system, camera(s) (for example, visible spectrum camera(s), infrared camera(s), etc.), temperature sensors, position sensors (for example, a global positioning system (GPS), etc.), location sensors, fuel sensors, motion sensors (for example, an inertial measurement unit (IMU), etc.), humidity sensors, occupancy sensors, and/or the like. The sensors are generally configured to generate sensor data. The sensor data can include information that describes the location of objects within the surrounding environment of the AV 102, information about the environment itself, information about the motion of the AV 102, information about a route of the vehicle, and/or the like. As AV 102 travels over a surface (for example, a road), at least some of the sensors may collect data pertaining to the surface.

As will be described in greater detail, AV 102 may be configured with a lidar system (for example, lidar system 264 of FIG. 2). The lidar system may be configured to transmit a light pulse 104 to detect objects located within a distance or range of distances of AV 102. Light pulse 104 may be incident on one or more objects (for example, AV 103) and be reflected back to the lidar system. Reflected light pulse 106 incident on the lidar system may be processed to determine a distance of that object to AV 102. The reflected light pulse 106 may be detected using, in some scenarios, a photodetector or array of photodetectors positioned and configured to receive the light reflected back into the lidar system. Lidar information, such as detected object data, is communicated from the lidar system to the on-board computing device 122. The AV 102 may also communicate lidar data to a remote computing device 110 (for example, a cloud processing system) over a network 108. Computing device 110 may be configured with one or more servers to process one or more processes of the technology described herein. Computing device 110 may also be configured to communicate data/instructions to/from AV 102 over network 108, to/from server(s) and/or database(s) 112.

It should be noted that the lidar systems for collecting data pertaining to the surface may be included in systems other than the AV 102 such as, without limitation, other vehicles (autonomous or driven), robots, satellites, etc.

Network 108 may include one or more wired or wireless networks. For example, the network 108 may include a cellular network (for example, a long-term evolution (LTE) network, a code division multiple access (CDMA) network, a 3G network, a 4G network, a 5G network, another type of next generation network, etc.). The network may also include a public land mobile network (PLMN), a local area network (LAN), a wide area network (WAN), a metropolitan area network (MAN), a telephone network (for example, the Public Switched Telephone Network (PSTN)), a private network, an ad hoc network, an intranet, the Internet, a fiber optic-based network, a cloud computing network, and/or the like, and/or a combination of these or other types of networks.

AV 102 may retrieve, receive, display, and edit information generated from a local application or delivered via network 108 from the database 112. Database 112 may be configured to store and supply raw data, indexed data, structured data, map data, program instructions or other configurations as is known.

The communications interface 120 may be configured to allow communication between AV 102 and external systems, such as, for example, external devices, sensors, other vehicles, servers, data stores, databases, etc. The communications interface 120 may utilize any now or hereafter known protocols, protection schemes, encodings, formats, packaging, etc. such as, without limitation, Wi-Fi, an infrared link, Bluetooth, etc. The user interface 124 may be part of peripheral devices implemented within the AV 102 including, for example, a keyboard, a touch screen display device, a microphone, and a speaker, etc. The vehicle also may receive state information, descriptive information or other information about devices or objects in its environment via the communication interface 120 over communication links such as those known as vehicle-to-vehicle, vehicle-to-object or other V2X communication links. The term "V2X" refers to a communication between a vehicle and any object that the vehicle may encounter or affect in its environment.

As noted above, the AV 102 may detect objects 103, 114, 116 in proximity thereto. Such object detections are facilitated using the sensor data generated by the sensor system 118 (for example, lidar datasets generated by an onboard lidar detector). The sensor data is processed by the onboard computing device 122 of the AV 102 and/or by the remote computing device 110 to obtain one or more predicted trajectories for the object given the sensor data. The predicted trajectories for the object may then be used to generate a trajectory for the AV 102. The AV 103 may then be caused by the on-board computing device to follow the trajectory.

FIG. 2 illustrates a system architecture 200 for a vehicle, in accordance with aspects of the disclosure. Vehicles 102 and/or 103 of FIG. 1 can have the same or similar system architecture as that shown in FIG. 2. Thus, the following discussion of system architecture 200 is sufficient for understanding vehicle(s) 102, 103 of FIG. 1. However, other types of vehicles are considered within the scope of the technology described herein and may contain more or less elements as described in association with FIG. 2. As a non-limiting example, an airborne vehicle may exclude brake or gear controllers, but may include an altitude sensor. In another non-limiting example, a water-based vehicle may include a depth sensor. One skilled in the art will appreciate that other propulsion systems, sensors and controllers may be included based on a type of vehicle, as is known.

As shown in FIG. 2, the system architecture 200 includes an engine or motor 202 and various sensors 204-218 for measuring various parameters of the vehicle. In gas-powered or hybrid vehicles having a fuel-powered engine, the sensors may include, for example, an engine temperature sensor 204, a battery voltage sensor 206, an engine Revolutions Per Minute (RPM) sensor 208, and a throttle position sensor 210. If the vehicle is an electric or hybrid vehicle, then the vehicle may have an electric motor, and accordingly will have sensors such as a battery monitoring system 212 (to measure current, voltage and/or temperature of the battery), motor current 214 and voltage 216 sensors, and motor position sensors 218 such as resolvers and encoders 218.

Operational parameter sensors that are common to both types of vehicles include, for example: a position sensor 236 such as an accelerometer, gyroscope and/or inertial measurement unit; a speed sensor 238; and an odometer sensor 240. The vehicle also may have a clock 242 that the system uses to determine vehicle time during operation. The clock 242 may be encoded into the vehicle on-board computing device 220, it may be a separate device, or multiple clocks may be available.

The vehicle also will include various sensors that operate to gather information about the environment in which the vehicle is traveling. These sensors may include, for example: a location sensor 260 (for example, a GPS device); object detection sensors such as one or more cameras 262; a lidar sensor system 264; and/or a RADAR and/or SONAR system 266. The sensors also may include environmental sensors 268 such as a precipitation sensor and/or ambient temperature sensor. The object detection sensors may enable the vehicle to detect objects that are within a given distance range of the vehicle in any direction, while the environmental sensors collect data about environmental conditions within the vehicle's area of travel.

During operations, information is communicated from the sensors to a vehicle on-board computing device 220. The vehicle on-board computing device 220 may be implemented using the computer system of FIG. 4. The vehicle on-board computing device 220 analyzes the data captured by the sensors and optionally controls operations of the vehicle based on results of the analysis. For example, the vehicle on-board computing device 220 may control: braking via a brake controller 222; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers. Auxiliary device controller 254 may be configured to control one or more auxiliary devices, such as testing systems, auxiliary sensors, mobile devices transported by the vehicle, etc.

Geographic location information may be communicated from the location sensor 260 to the vehicle on-board computing device 220, which may then access a map of the environment that corresponds to the location information to determine known fixed features of the environment such as streets, buildings, stop signs and/or stop/go signals. Captured images from the cameras 262 and/or object detection information captured from sensors such as lidar system 264 is communicated from those sensors to the vehicle on-board computing device 220. The object detection information and/or captured images are processed by the vehicle on-board computing device 220 to detect objects in proximity to the vehicle. Any known or to be known technique for making an object detection based on sensor data and/or captured images can be used in the embodiments disclosed in this document.

Lidar information is communicated from lidar system 264 to the vehicle on-board computing device 220. Additionally, captured images are communicated from the camera(s) 262 to the vehicle on-board computing device 220. The lidar information and/or captured images are processed by the vehicle on-board computing device 220 to detect objects in proximity to the vehicle. The manner in which the object detections are made by the vehicle on-board computing device 220 includes such capabilities detailed in this disclosure.

In addition, the system architecture 200 may include an onboard display device 270 that may generate and output an interface on which sensor data, vehicle status information, or outputs generated by the processes described in this document are displayed to an occupant of the vehicle. The display device may include, or a separate device may be, an audio speaker that presents such information in audio format.

The vehicle on-board computing device 220 may include and/or may be in communication with a routing controller 232 that generates a navigation route from a start position to a destination position for an autonomous vehicle. The routing controller 232 may access a map data store to identify possible routes and road segments that a vehicle can travel on to get from the start position to the destination position. The routing controller 232 may score the possible routes and identify a preferred route to reach the destination. For example, the routing controller 232 may generate a navigation route that minimizes Euclidean distance traveled or other cost function during the route, and may further access the traffic information and/or estimates that can affect an amount of time it will take to travel on a particular route. Depending on implementation, the routing controller 232 may generate one or more routes using various routing methods, such as Dijkstra's algorithm, Bellman-Ford algorithm, or other algorithms. The routing controller 232 may also use the traffic information to generate a navigation route that reflects expected conditions of the route (for example, current day of the week or current time of day, etc.), such that a route generated for travel during rush-hour may differ from a route generated for travel late at night. The routing controller 232 may also generate more than one navigation route to a destination and send more than one of these navigation routes to a user for selection by the user from among various possible routes.

In some scenarios, the vehicle on-board computing device 220 may determine perception information of the surrounding environment of the vehicle. Based on the sensor data provided by one or more sensors and location information that is obtained, the vehicle on-board computing device 220 may determine perception information of the surrounding environment of the vehicle. The perception information may represent what an ordinary driver would perceive in the surrounding environment of a vehicle. The perception data may include information relating to one or more objects in the environment of the vehicle. For example, the vehicle on-board computing device 220 may process sensor data (for example, lidar data, RADAR data, camera images, etc.) in order to identify objects and/or features in the environment of vehicle. The objects may include, but is not limited to, traffic signals, roadway boundaries, other vehicles, pedestrians, and/or obstacles. The vehicle on-board computing device 220 may use any now or hereafter known object recognition algorithms, video tracking algorithms, and computer vision algorithms (for example, track objects frame-to-frame iteratively over a number of time periods) to determine the perception.

In those or other scenarios, the vehicle on-board computing device 220 may also determine, for one or more identified objects in the environment, the current state of the object. The state information may include, without limitation, for each object: a current location; a current speed; an acceleration; a current heading; a current pose; a current shape, size and/or footprint; an object type or classification (for example, vehicle, pedestrian, bicycle, static object, or obstacle); and/or other state information.

The vehicle on-board computing device 220 may perform one or more prediction and/or forecasting operations. For example, the vehicle on-board computing device 220 may predict future locations, trajectories, and/or actions of one or more objects. For example, the vehicle on-board computing device 220 may predict the future locations, trajectories, and/or actions of the objects based at least in part on perception information (for example, the state data for each object comprising an estimated shape and pose determined as discussed below), location information, sensor data, and/or any other data that describes the past and/or current state of the objects, the vehicle, the surrounding environment, and/or their relationship(s). For example, if an object is a vehicle and the current driving environment includes an intersection, the vehicle on-board computing device 220 may predict whether the object will likely move straight forward or make a turn. If the perception data indicates that the intersection has no traffic light, the vehicle on-board computing device 220 may also predict whether the vehicle may have to fully stop prior to entering the intersection.

In those or other scenarios, the vehicle on-board computing device 220 may determine a motion plan for the vehicle. For example, the vehicle on-board computing device 220 may determine a motion plan for the vehicle based on the perception data and/or the prediction data. Specifically, given predictions about the future locations of proximate objects and other perception data, the vehicle on-board computing device 220 can determine a motion plan for the vehicle that best navigates the vehicle relative to the objects at their future locations.

In those or other scenarios, the vehicle on-board computing device 220 may receive predictions and make a decision regarding how to handle objects and/or actors in the environment of the vehicle. For example, for a particular actor (for example, a vehicle with a given speed, direction, turning angle, etc.), the vehicle on-board computing device 220 decides whether to overtake, yield, stop, and/or pass based on, for example, traffic conditions, map data, state of the autonomous vehicle, etc. Furthermore, the vehicle on-board computing device 220 also plans a path for the vehicle to travel on a given route, as well as driving parameters (for example, distance, speed, and/or turning angle). That is, for a given object, the vehicle on-board computing device 220 decides what to do with the object and determines how to do it. For example, for a given object, the vehicle on-board computing device 220 may decide to pass the object and may determine whether to pass on the left side or right side of the object (including motion parameters such as speed). The vehicle on-board computing device 220 may also assess the risk of a collision between a detected object and the vehicle. If the risk exceeds an acceptable threshold, it may determine whether the collision can be avoided if the vehicle follows a defined vehicle trajectory and/or implements one or more dynamically generated emergency maneuvers in a time period (for example, N milliseconds). If the collision can be avoided, then the vehicle on-board computing device 220 may execute one or more control instructions to perform a cautious maneuver (for example, mildly slow down, accelerate, change lane, or swerve). In contrast, if the collision cannot be avoided, then the vehicle on-board computing device 220 may execute one or more control instructions for execution of an emergency maneuver (for example, brake and/or change direction of travel).

As discussed above, planning and control data regarding the movement of the vehicle is generated for execution. The vehicle on-board computing device 220 may, for example: control braking via a brake controller; direction via a steering controller; speed and acceleration via a throttle controller (in a gas-powered vehicle) or a motor speed controller (such as a current level controller in an electric vehicle); change gears via a differential gear controller (in vehicles with transmissions); and/or control other operations via other controllers.

Figure 3:
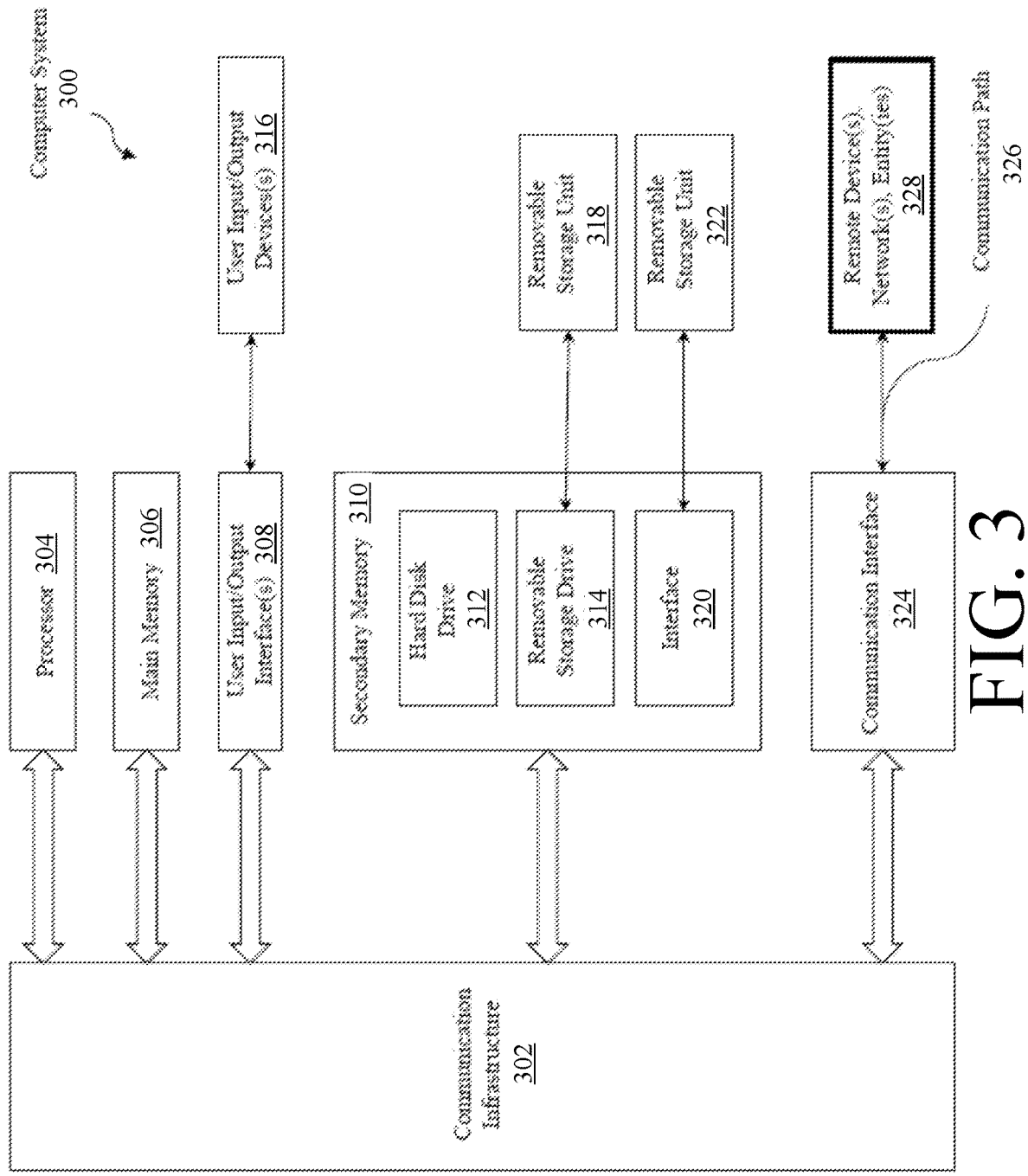
FIG. 3 is an illustration of an illustrative computing device.

The present solution can be implemented, for example, using one or more computer systems, such as computer system 300 shown in FIG. 3. Computer system 300 can be any computer capable of performing the functions described herein. The on-board computing device 122 of FIG. 1, computing device 110 of FIG. 1, robotic device(s) 152 of FIG. 1, mobile communication device(s) 156 of FIG. 1, and/or the vehicle on-board computing device 220 of FIG. 2 may be the same as or similar to computing system 300. As such, the discussion of computing system 300 is sufficient for understanding the devices 110, 122, 152, 156 and 220 of FIGS. 1-2.

Computing system 300 may include more or less components than those shown in FIG. 3. However, the components shown are sufficient to disclose an illustrative solution implementing the present solution. The hardware architecture of FIG. 3 represents one implementation of a representative computing system configured to operate a vehicle, as described herein. As such, the computing system 300 of FIG. 3 implements at least a portion of the method(s) described herein.

Some or all components of the computing system 300 can be implemented as hardware, software and/or a combination of hardware and software. The hardware includes, but is not limited to, one or more electronic circuits. The electronic circuits can include, but are not limited to, passive components (for example, resistors and capacitors) and/or active components (for example, amplifiers and/or microprocessors). The passive and/or active components can be adapted to, arranged to and/or programmed to perform one or more of the methodologies, procedures, or functions described herein.

Computer system 300 includes one or more processors (also called central processing units, or CPUs), such as a processor 304. Processor 304 is connected to a communication infrastructure or bus 302. One or more processors 304 may each be a graphics processing unit (GPU). In some scenarios, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 300 also includes user input/output device(s) 316, such as monitors, keyboards, pointing devices, etc., that communicate with communication infrastructure 302 through user input/output interface(s) 308. Computer system 300 further includes a main or primary memory 306, such as random access memory (RAM). Main memory 306 may include one or more levels of cache. Main memory 306 has stored therein control logic (i.e., computer software) and/or data.

One or more secondary storage devices or memories 310 may be provided with computer system 300. Secondary memory 310 may include, for example, a hard disk drive 312 and/or a removable storage device or drive 314. Removable storage drive 314 may be an external hard drive, a universal serial bus (USB) drive, a memory card such as a compact flash card or secure digital memory, a floppy disk drive, a magnetic tape drive, a compact disc drive, an optical storage device, a tape backup device, and/or any other storage device/drive.

Removable storage drive 314 may interact with a removable storage unit 318. Removable storage unit 318 includes a computer usable or readable storage device having stored thereon computer software (control logic) and/or data. Removable storage unit 318 may be an external hard drive, a universal serial bus (USB) drive, a memory card such as a compact flash card or secure digital memory, a floppy disk, a magnetic tape, a compact disc, a DVD, an optical storage disk, and/or any other computer data storage device. Removable storage drive 314 reads from and/or writes to removable storage unit 314 in a well-known manner.

In some scenarios, secondary memory 310 may include other means, instrumentalities or other approaches for allowing computer programs and/or other instructions and/or data to be accessed by computer system 300. Such means, instrumentalities or other approaches may include, for example, a removable storage unit 322 and an interface 320. Examples of the removable storage unit 322 and the interface 320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 300 may further include a communication or network interface 324. Communication interface 324 enables computer system 300 to communicate and interact with any combination of remote devices, remote networks, remote entities, etc. (individually and collectively referenced by reference number 328). For example, communication interface 324 may allow computer system 300 to communicate with remote devices 328 over communications path 326, which may be wired and/or wireless, and which may include any combination of LANs, WANs, the Internet, etc. Control logic and/or data may be transmitted to and from computer system 300 via communication path 326.

In some scenarios, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 300, main memory 306, secondary memory 310, and removable storage units 318 and 322, as well as tangible articles of manufacture embodying any combination of the foregoing. Such control logic, when executed by one or more data processing devices (such as computer system 300), causes such data processing devices to operate as described herein.

Based on the teachings contained in this disclosure, it will be apparent to persons skilled in the relevant art(s) how to make and use the present solution using data processing devices, computer systems and/or computer architectures other than that shown in FIG. 3. In particular, the present solution can operate with software, hardware, and/or operating system implementations other than those described herein.

Figure 4:
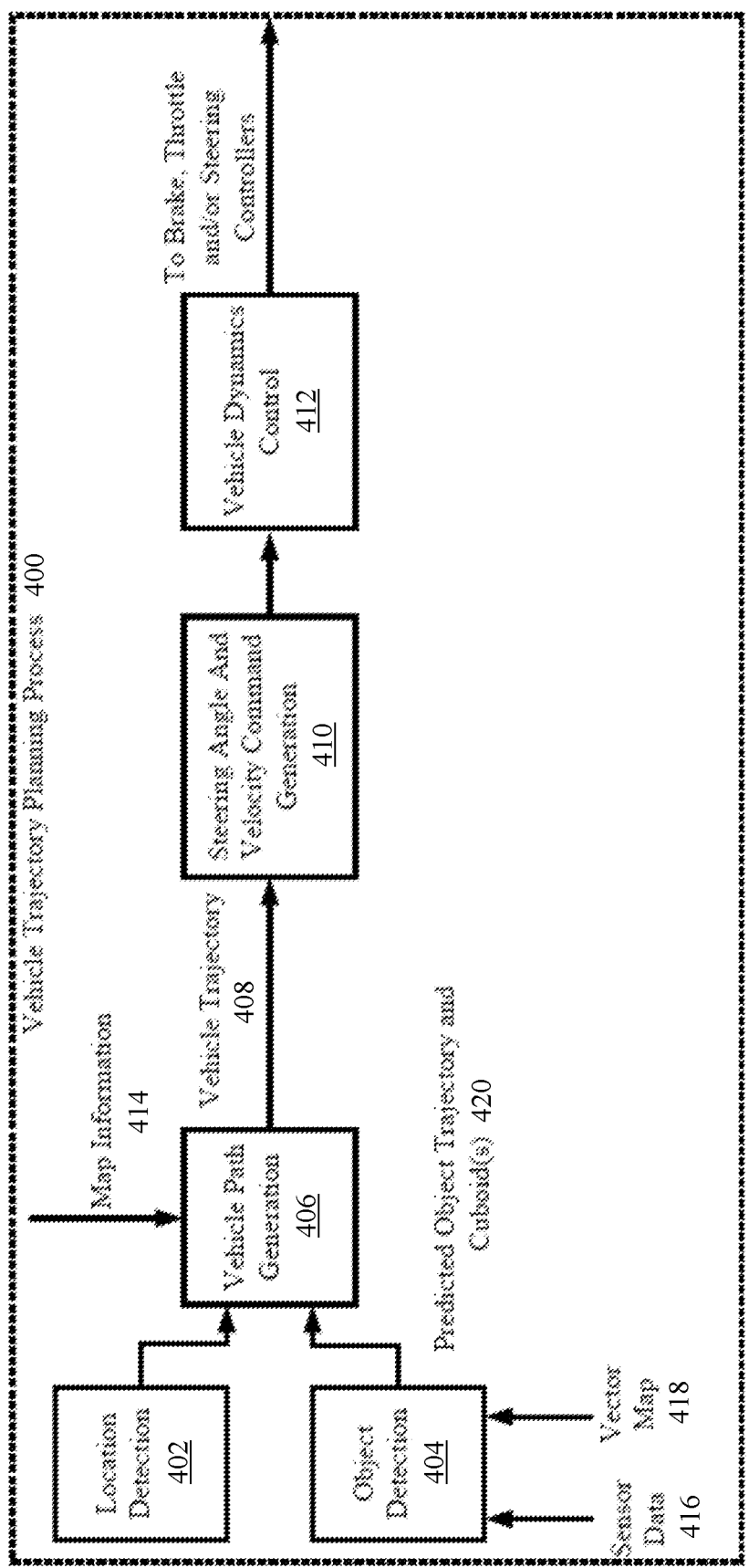
FIG. 4 provides a block diagram of an illustrative vehicle trajectory planning process.

FIG. 4 provides a block diagram that is useful for understanding how motion or movement of an AV is achieved in accordance with the present solution. All of the operations performed in blocks 402-412 can be performed by the on-board computing device (for example, on-board computing device 122 of FIG. 1 and/or 220 of FIG. 2) of a vehicle (for example, AV 102 of FIG. 1).

In block 402, a location of the AV (for example, AV 102 of FIG. 1) is detected. This detection can be made based on sensor data output from a location sensor (for example, location sensor 260 of FIG. 2) of the AV. This sensor data can include, but is not limited to, GPS data. The detected location of the AV is then passed to block 406.

In block 404, an object (for example, vehicle 103 of FIG. 1) is detected within proximity of the AV (for example, <100+ meters). This detection is made based on sensor data output from a camera (for example, camera 262 of FIG. 2) of the AV and/or a lidar system (for example, lidar system 264 of FIG. 2) of the AV. For example, image processing is performed to detect an instance of an object of a certain class (for example, a vehicle, cyclist or pedestrian) in an image. The image processing/object detection can be achieved in accordance with any known or to be known image processing/object detection algorithm.

Additionally, a predicted trajectory is determined in block 404 for the object. The object's trajectory is predicted in block 404 based on the object's class, cuboid geometry(ies), cuboid heading(s) and/or contents of a map 418 (for example, sidewalk locations, lane locations, lane directions of travel, driving rules, etc.). The manner in which the cuboid geometry(ies) and heading(s) are determined will become evident as the discussion progresses. At this time, it should be noted that the cuboid geometry(ies) and/or heading(s) are determined using sensor data of various types (for example, 2D images, 3D lidar point clouds) and a vector map 418 (for example, lane geometries). Techniques for predicting object trajectories based on cuboid geometries and headings may include, for example, predicting that the object is moving on a linear path in the same direction as the heading direction of a cuboid. The predicted object trajectories can include, but are not limited to, the following trajectories: a trajectory defined by the object's actual speed (for example, 1 mile per hour) and actual direction of travel (for example, west); a trajectory defined by the object's actual speed (for example, 1 mile per hour) and another possible direction of travel (for example, south, south-west, or X (for example, 40°) degrees from the object's actual direction of travel in a direction towards the AV) for the object; a trajectory defined by another possible speed for the object (for example, 2-10 miles per hour) and the object's actual direction of travel (for example, west); and/or a trajectory defined by another possible speed for the object (for example, 2-10 miles per hour) and another possible direction of travel (for example, south, south-west, or X (for example, 40°) degrees from the object's actual direction of travel in a direction towards the AV) for the object. The possible speed(s) and/or possible direction(s) of travel may be pre-defined for objects in the same class and/or sub-class as the object. It should be noted once again that the cuboid defines a full extent of the object and a heading of the object. The heading defines a direction in which the object's front is pointed, and therefore provides an indication as to the actual and/or possible direction of travel for the object.

Information 420 specifying the object's predicted trajectory, the cuboid geometry(ies)/heading(s) is provided to block 406. In some scenarios, a classification of the object is also passed to block 406. In block 406, a vehicle trajectory is generated using the information from blocks 402 and 404. Techniques for determining a vehicle trajectory using cuboids may include, for example, determining a trajectory for the AV that would pass the object when the object is in front of the AV, the cuboid has a heading direction that is aligned with the direction in which the AV is moving, and the cuboid has a length that is greater than a threshold value. The present solution is not limited to the particulars of this scenario. The vehicle trajectory 420 can be determined based on the location information from block 402, the object detection information from block 404, and/or map information 414 (which is pre-stored in a data store of the vehicle). The map information 414 may include, but is not limited to, all or a portion of road map(s) 160 of FIG. 1. The vehicle trajectory 420 may represent a smooth path that does not have abrupt changes that would otherwise provide passenger discomfort. For example, the vehicle trajectory is defined by a path of travel along a given lane of a road in which the object is not predicted to travel within a given amount of time. The vehicle trajectory 420 is then provided to block 408.

In block 408, a steering angle and velocity command is generated based on the vehicle trajectory 420. The steering angle and velocity command are provided to block 410 for vehicle dynamics control, i.e., the steering angle and velocity command causes the AV to follow the vehicle trajectory 408.

Figure 5:
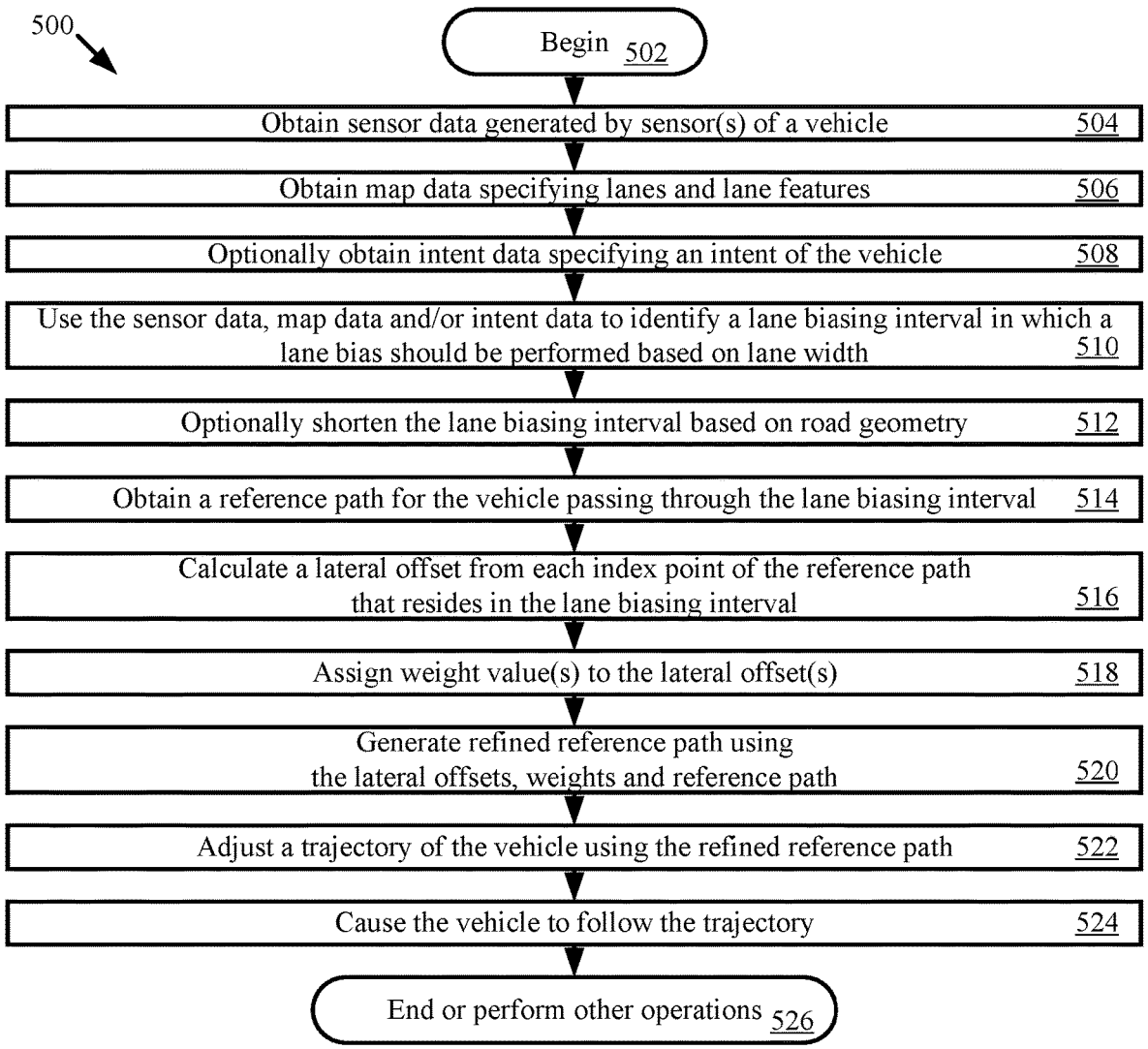
FIG. 5 provides a flow diagram of an illustrative method for biasing a trajectory of a vehicle while moving in a lane.

FIG. 5 provides a flow diagram of an illustrative method 500 for biasing a trajectory of a vehicle (for example, vehicle 102 of FIG. 1) while moving in a lane. Method 500 can be performed at least partially by an on-board computing device (for example, on-board computing device 122 of FIG. and/or vehicle on-board computing device 220 of FIG. 2) of the vehicle and/or another computing device (for example, server 110 of FIG. 1 and/or computer system 300 of FIG. 3).

Method 500 begins with 502 and continues with 504 where the computing device obtains sensor data generated by sensor(s) (for example, sensor system 118 of FIG. 1 and/or sensor(s) 236-240, 260-268 of FIG. 2) of the vehicle. The computing device also obtains map data in 506 and optionally intent data in 508. The map data specifies lanes, lane features (for example, curbs, boundary marks or lines, one-way or two-way travel direction(s), speed limits, etc.) and intersections. The intent data specifies an intent of the vehicle to travel straight in a given lane, to turn right at a given intersection, to turn left at the given intersection, to travel in particular lane(s), to travel on particular side(s) of lane(s) (for example, center, left or right side of a lane), and/or to travel in particular lane(s) after lane split(s). A vehicle's intent can be obtained, for example, using a route defined by a path of travel from a start location to a destination location and/or based on lane information contained in the map data. If the vehicle's intent is not clear, then an assumption may be made by the computing device that the vehicle will stay in a right-side of the lane.

The sensor, map and/or intent data is(are) used by the computing device in 510 to identify a lane biasing interval in which a lane bias should be performed based on lane width. The lane biasing should be performed for lanes classified as wide lanes, and may not be performed for lanes classified as narrow lanes. A lane is classified as a wide lane when a portion of the lane in the lane biasing interval has a width W equal to or greater than a threshold width $thr_w$ (for example, twice a width of the vehicle). A lane is classified as a narrow lane when (i) the lane has a constant width $W_{constant}$ that is less than the threshold width $thr_w$ or (ii) the lane has a variable width $W_{variable}$ in which a ratio of a width $W_{wide}$ of the widest portion of the lane to a width $W_{narrow}$ of the narrowest portion of the lane is less than or equal to a threshold value $thr_{ratio}$ (for example, $W_{wide}/W_{narrow} \leq 0.5$).

For example, if the lane becomes 50% narrow than the widest point, then the lane is classified as a narrow lane. The present solution is not limited to the particulars of this example.

The lane biasing interval is part of a wide lane prior to a turn, a lane split or a lane width variation (for example, a narrowing). The lane biasing interval can have: a length L set to a calibration parameter; an end E located a calibratable distance D from a start of a turn or corner interval defined by corner constraints, a start of a width change in the lane, or a start of a lane split; a pre-lane biasing interval in which a lateral offset is set to zero or a small value; and a post-lane biasing interval in which a lateral offset weight is set to zero or a small value. The lengths of the pre-lane biasing interval and the post-lane biasing interval are selected in accordance with a given application (for example, set to pre-defined lengths). Illustrations are provided in FIGS. 6-10 that are useful for understanding pre-lane biasing intervals, lane biasing intervals and post-lane biasing intervals.

Figure 6:
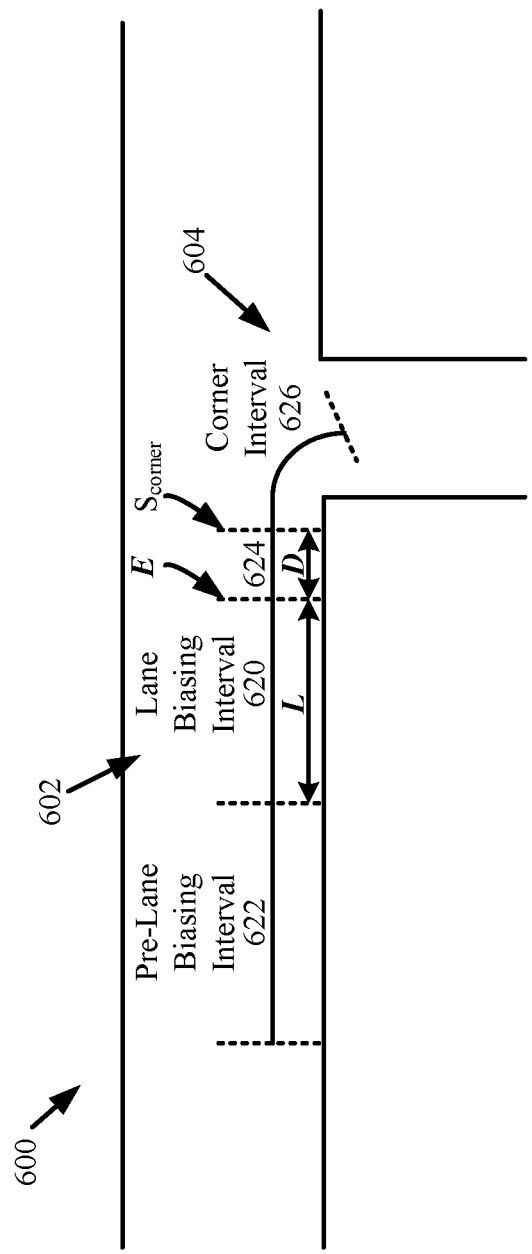
FIGS. 6-10 each provides an illustration that is useful for understanding a lane biasing interval.

As shown in FIG. 6, a lane biasing interval 620 comprises a portion 602 of a wide lane 600 prior to a turn 604. Portion 602 has: a length L set to a calibration parameter; an end E located a calibratable distance D from a start $S_{corner}$ of a turn or corner interval 626 defined by corner constraints; a pre-lane biasing interval 622 in which a lateral offset weight is set to zero or a small value; and a post-lane biasing interval 624 in which a lateral offset weight is set to zero or a small value.

Figure 7:
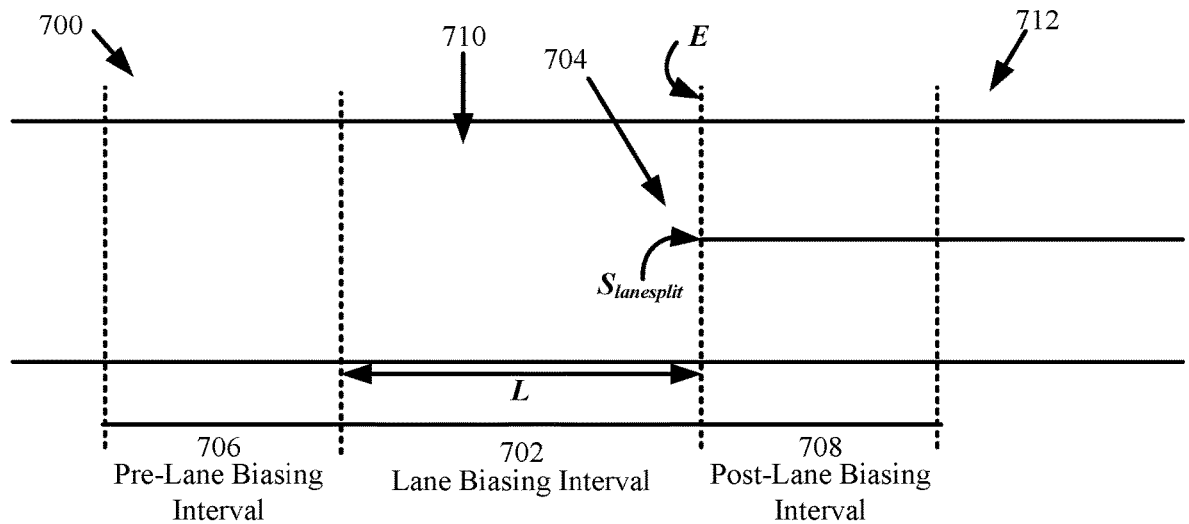

As shown in FIG. 7, a lane biasing interval 702 comprises a portion 710 of a wide lane 700 prior to a lane split 704. Portion 710 has: a length L set to a calibration parameter; an end E located a calibratable distance D (here D=0) from a start $S_{lanesplit}$ of the lane split 712; a pre-lane biasing interval 706 in which a lateral offset weight is set to zero or a small value; and a post-lane biasing interval 708 in which a lateral offset weight is set to zero or a small value.

Figure 8:
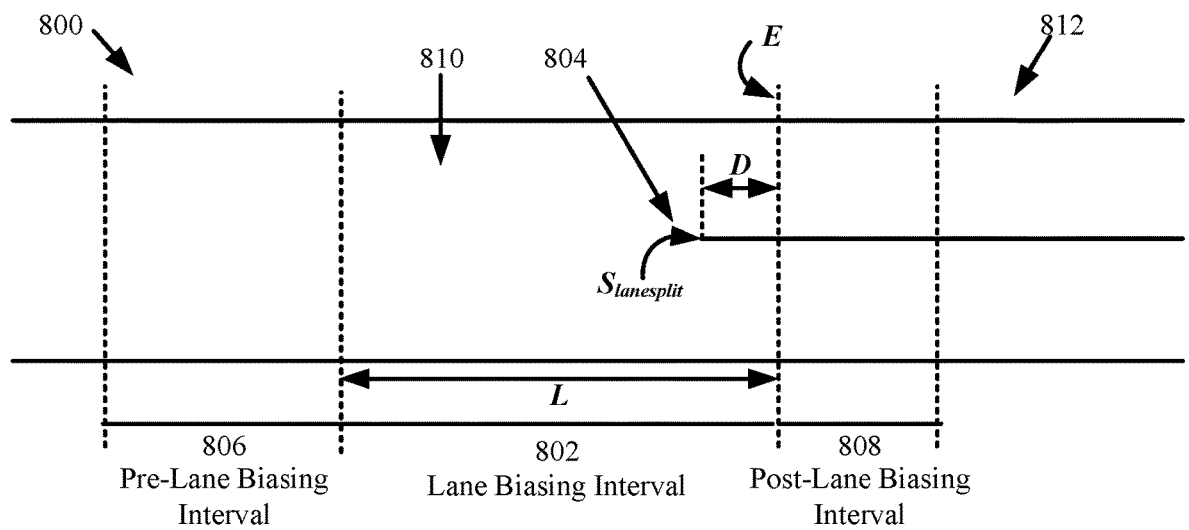

As shown in FIG. 8, a lane biasing interval 802 comprises a portion 810 of a wide lane 800 that begins prior to a lane split 804 and ends after the lane split. Portion 810 has: a length L set to a calibration parameter; an end E located a calibratable distance D from a start $S_{lanesplit}$ of a lane split interval 812; a pre-lane biasing interval 806 in which a lateral offset weight is set to zero or a small value; and a post-lane biasing interval 808 in which a lateral offset weight is set to zero or a small value. The present solution is not limited to the particulars of FIG. 8. In other scenarios, the end E of the lane biasing interval 802 resides prior (instead of after as shown) to the start $S_{lanesplit}$ of a lane split interval 812.

Figure 9:
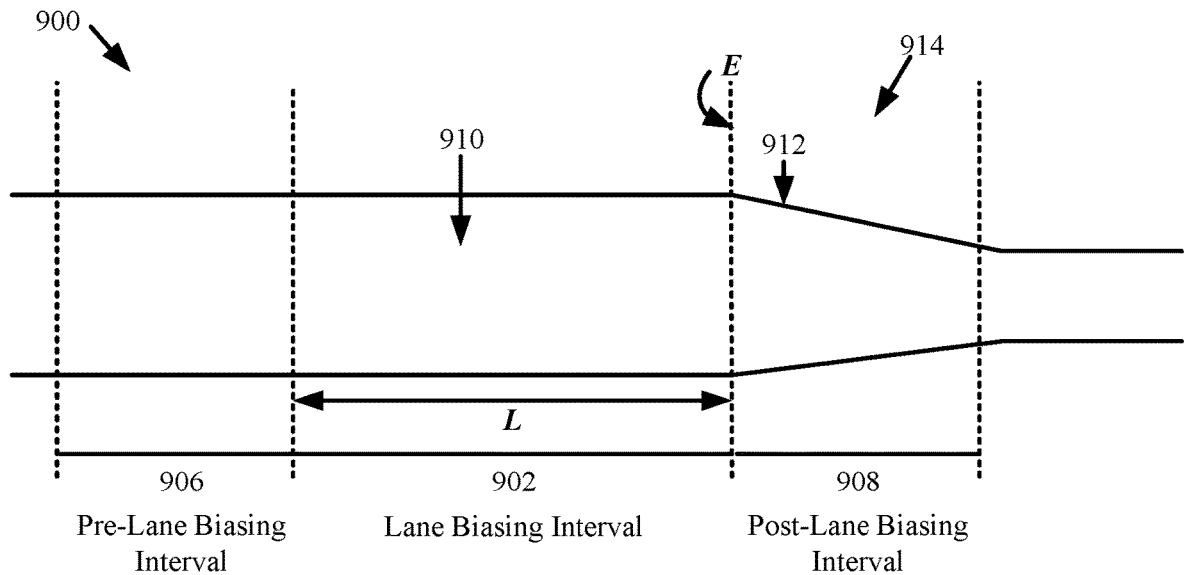

As shown in FIG. 9, a lane biasing interval 902 comprises a portion 910 of a wide lane 900 prior to a lane width variation 912 (for example, a narrowing). Portion 910 has: a length L set to a calibration parameter; an end E located a calibratable distance D (here D=0) from a start $S_{narrowing}$ of a width change interval 914; a pre-lane biasing interval 906 in which a lateral offset weight is set to zero or a small value; and a post-lane biasing interval 908 in which a lateral offset weight is set to zero or a small value.

Figure 10:
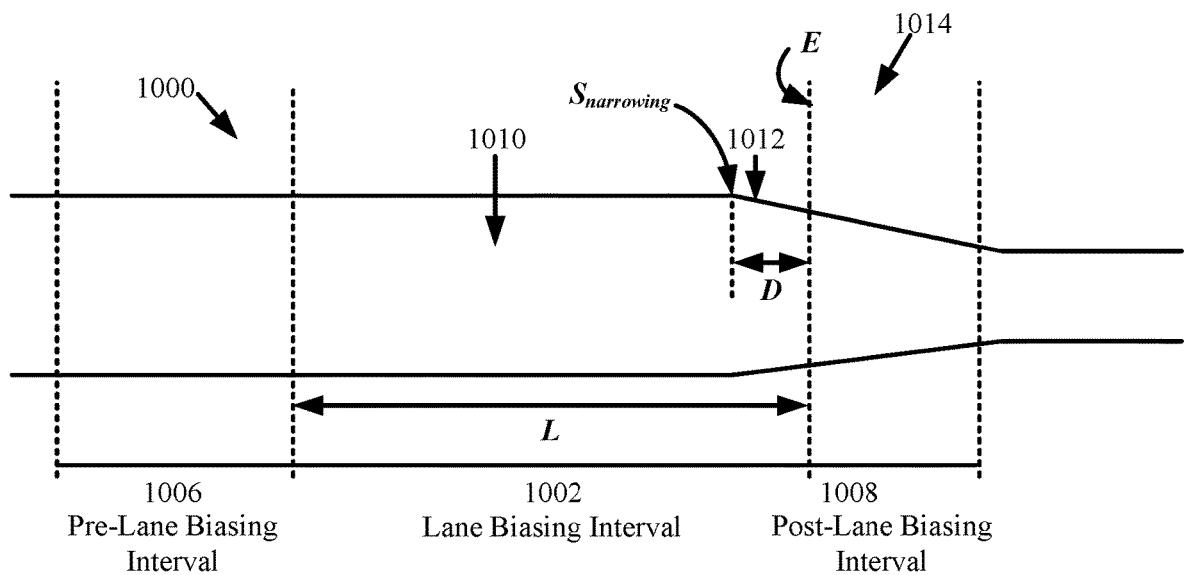

As shown in FIG. 10, a lane biasing interval 1002 comprises a portion 1010 of a wide lane 1000 that begins prior to a lane width variation 1012 (for example, a narrowing) and ends after the lane width variation 1012. The lane biasing interval 1002 can have a predefined length L and an end E located adjacent to or a pre-defined distance D from a start $S_{narrowing}$ of width change interval 1014. The present solution is not limited to the particulars of FIG. 10. In other scenarios, the end E of the lane biasing interval 1002 resides prior to (instead of after as shown) the start $S_{narrowing}$ of the lane width variation 1012.

Figure 11:
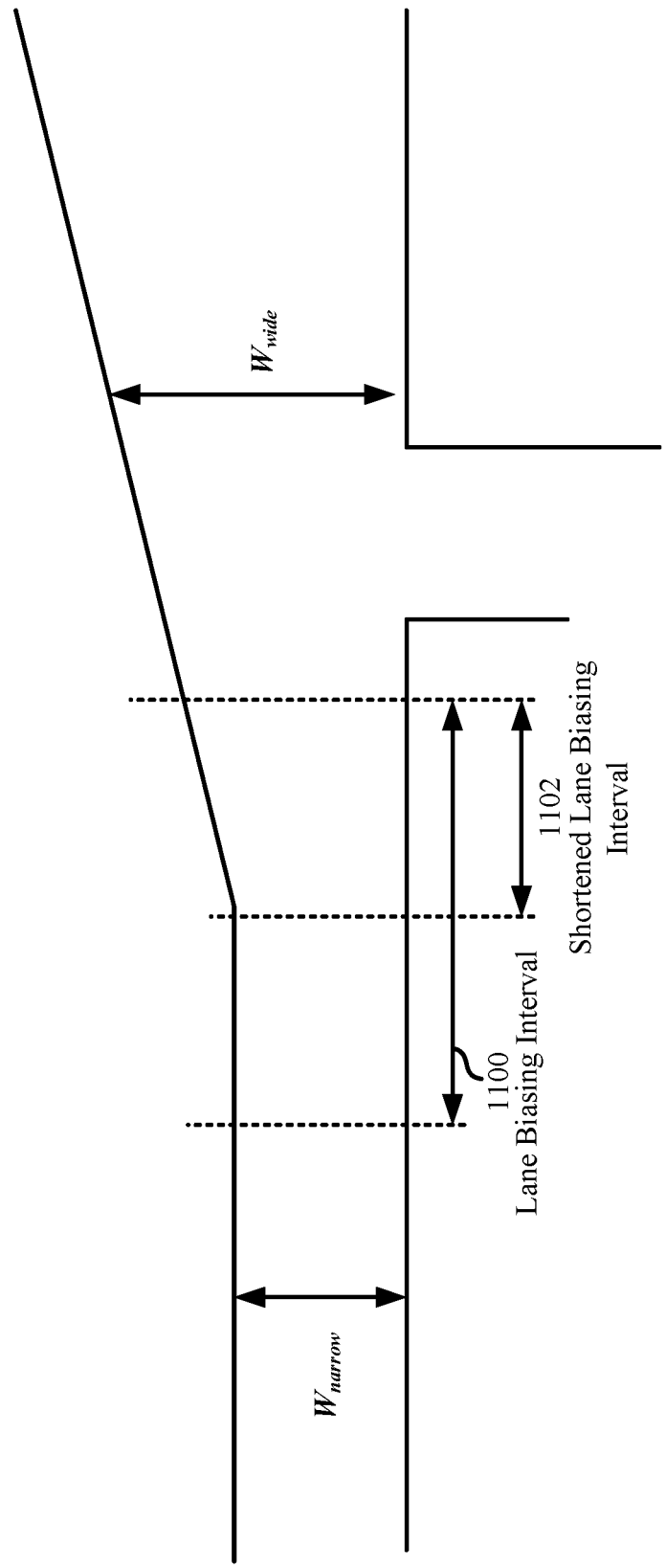
FIG. 11 provides an illustration showing how a lane biasing interval can be adjusted or otherwise modified based on road geometry.

Referring again to FIG. 5, the lane biasing interval can be optionally adjusted or otherwise modified in 512 based on road geometry which may be defined in the map data. For example, as shown in FIG. 11, a lane biasing interval 1100 is adjusted to create a shortened lane biasing interval 1102 due to the lane width changing from a narrow width $W_{narrow}$ to a wide width $W_{wide}$. The present solution is not limited to the particulars of FIG. 11. A lane biasing interval can be adjusted in other different ways based on road geometry.

In 514, the computing device obtains a reference path for the vehicle that passes through the lane biasing interval. The reference path may be generated using the map data or may be predefined by the map data. For example, as shown in FIG. 13, a reference path 1306 is generated or defined as a path that extends adjacent to a center 1302 of a lane 1300 in which the vehicle is to travel. The reference path 1306 may be offset from the center 1302 of the lane 1300 by an amount A selected in accordance with a given application (as shown in FIG. 13). The present solution is not limited to the particulars of this example. The reference path may reside on either side of the lane's center or be aligned with the lane's center such that it overlaps and extends there along.

In 516, the computing device performs operations to calculate a lateral offset O from each index point on the reference path that resides in the lane biasing interval. This computation is different for turn scenarios and lane split/variable lane width scenarios (for example, lane narrowing). This computation for turn scenarios will be described first, followed by a discussion of how lateral offsets are computed in the lane split scenarios and variable lane width scenarios.

Turn Scenarios

Figure 12:
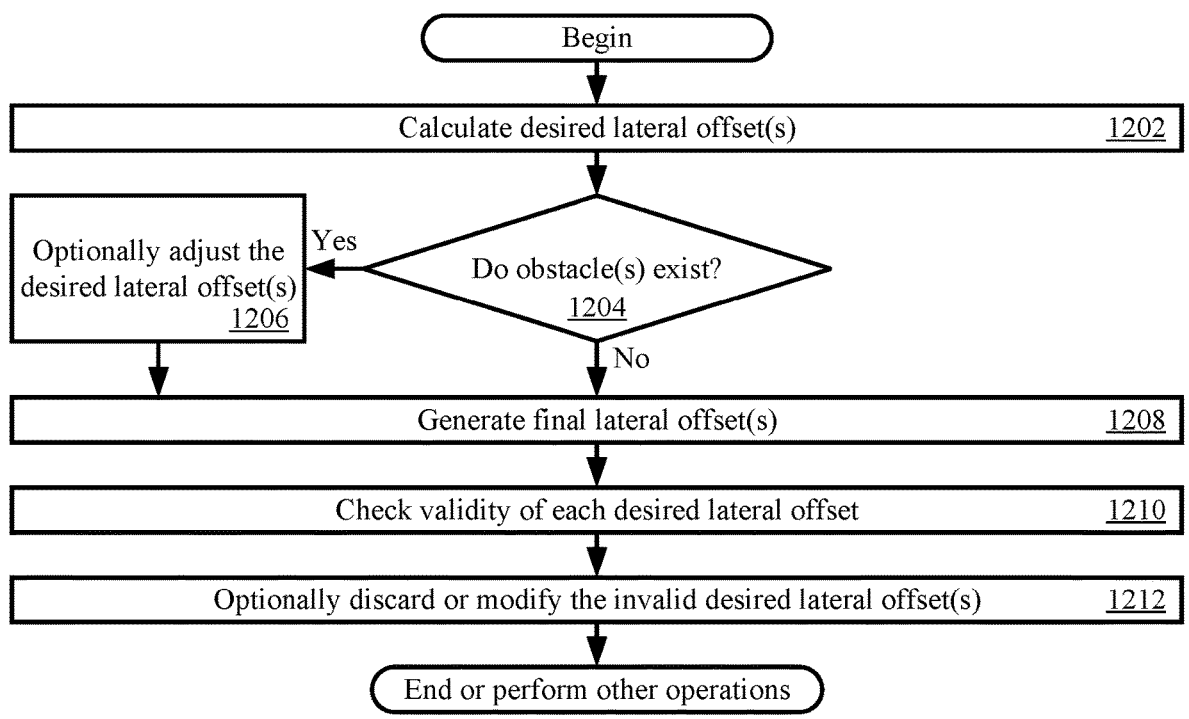
FIG. 12 provides a flow diagram of an illustrative method for calculating a lateral offset from each index point on a reference path that resides in a lane biasing interval.
Figure 15:
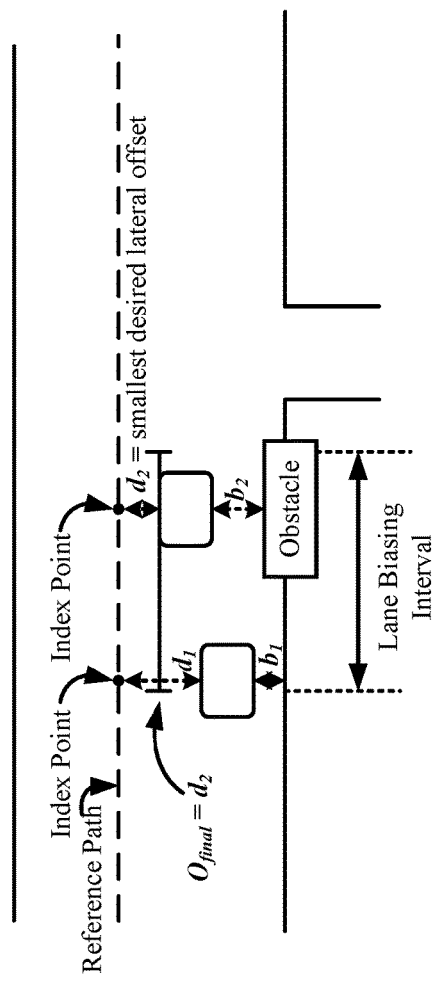
FIGS. 15-16 each provide an illustration that is useful for understanding how a final lateral offset is generated for an index point in a lane biasing interval.
Figure 16:
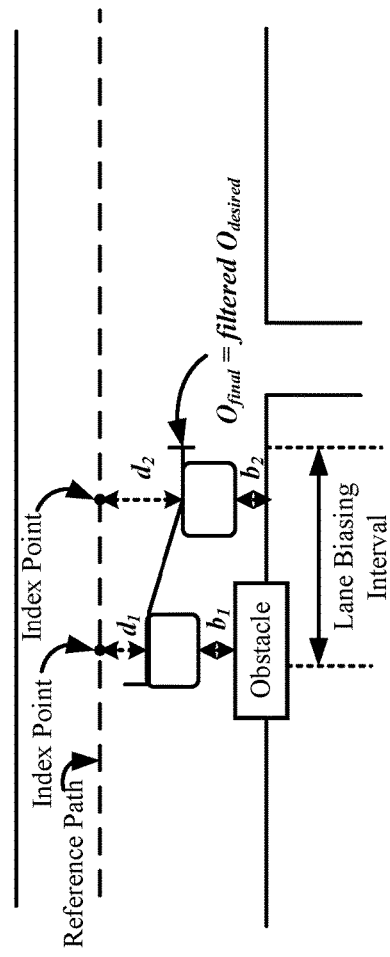
Figure 17:
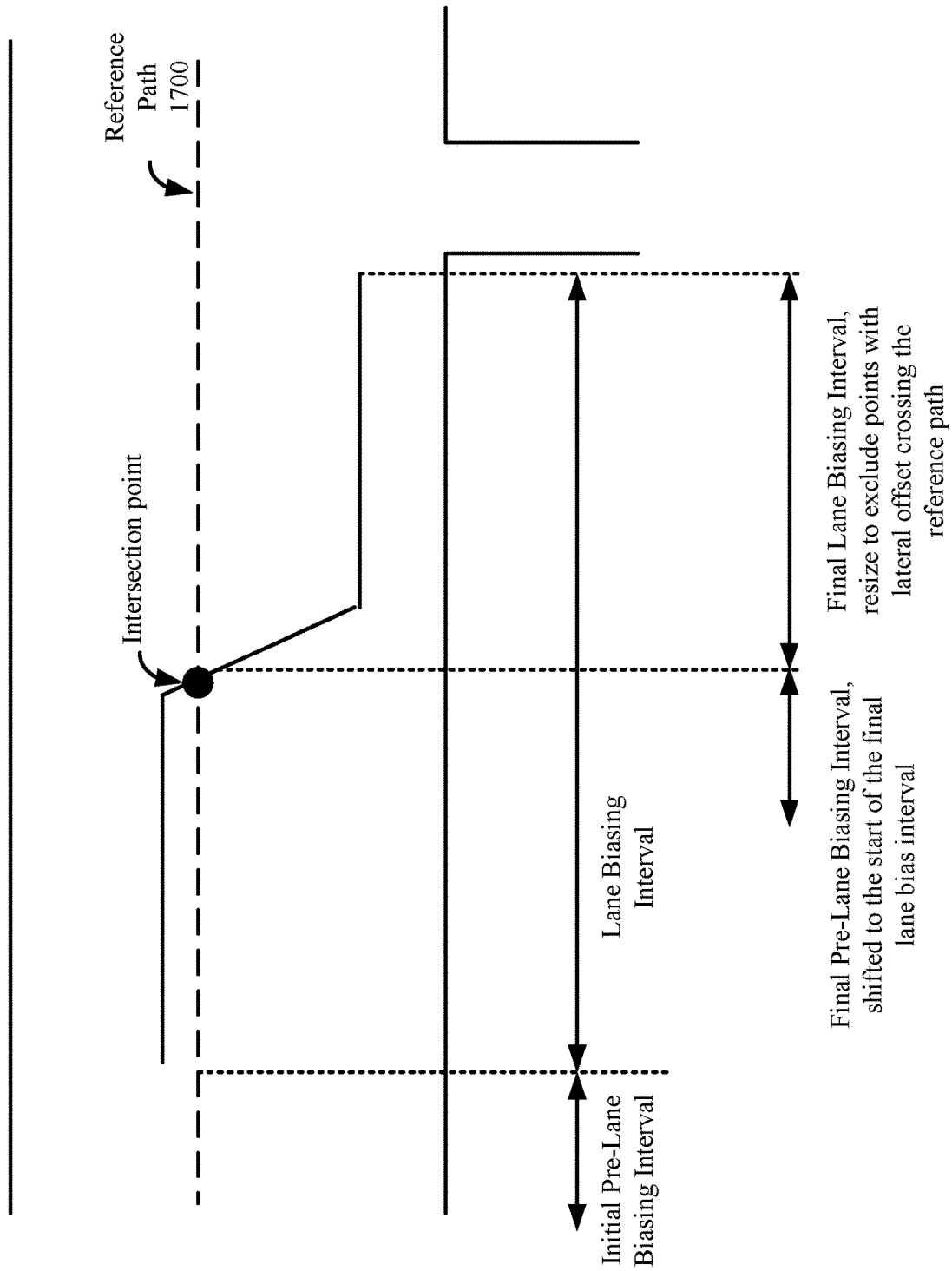
FIG. 17 provides an illustration that is useful for understanding a validity check.
Figure 18:
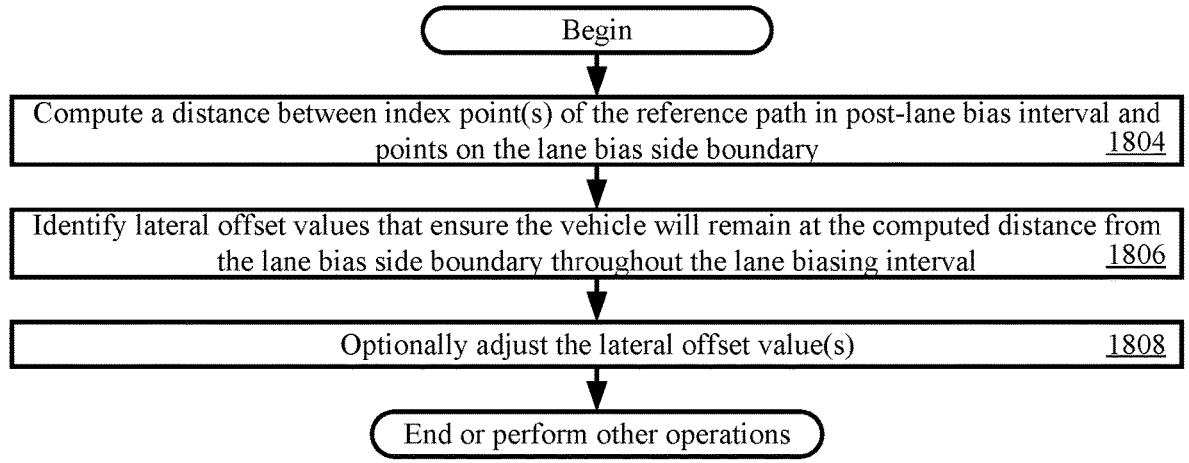
FIGS. 18-21 provide illustrations that are useful for understanding how desired lateral offsets are calculated in lane split or variable lane width scenarios.
Figure 19:
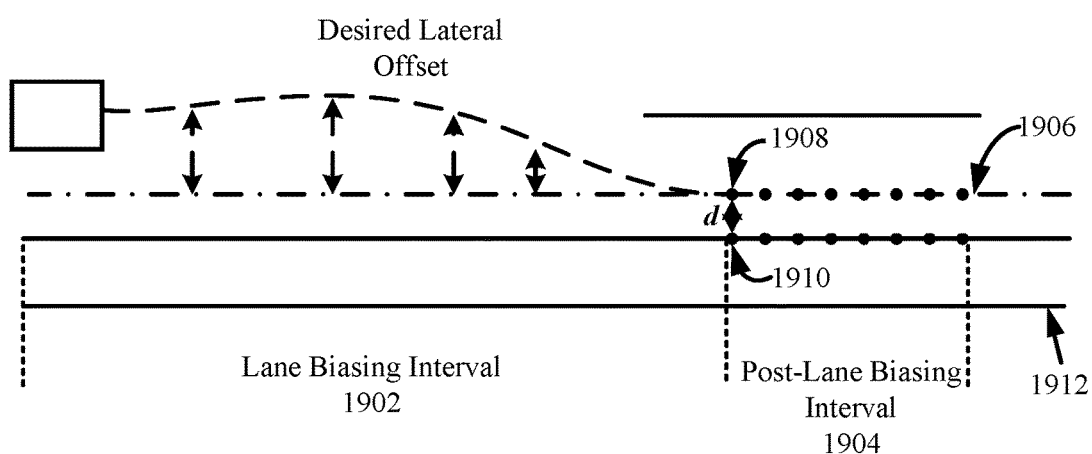

For turn scenarios, the computation of 516 will be described with reference to FIGS. 12-17. As shown in FIG. 12, this computation begins with 1202 which involves calculating a plurality of desired lateral offsets $O_{desired}$. Each desired lateral offset $O_{desired}$ corresponds to a distance d between an index point 1310 of the reference path 1306 and a buffer object 1312 residing a buffered distance b from an inside boundary mark/line 1314 of the lane, as shown in FIG. 13. If there is a shoulder or a bike lane prior to the turn on which the vehicle can drive, then the buffered distance b will be set to zero or a value that will cause the vehicle to drive outside of the lane boundary mark/line (for example, a negative value). Otherwise, the buffered distance b is set to a value that will cause the vehicle to drive inside the lane boundary mark/line (for example, a positive value). For right-hand turns, the boundary is the right-side boundary of the lane. For left-hand turns, the boundary is the left-side boundary of the lane.

If obstacle(s) exist(s) [1204:YES], then the desired lateral offset $O_{desired}$ is optionally adjusted in 1206 such that the vehicle will be a buffered distance b' from the obstacle(s). Stated differently, the desired lateral offset $O_{desired}$ is adjusted such that the buffer object 1312 resides a buffered distance b' from the obstacle 1400 as shown in FIG. 14. The following obstacles may not be considered by the computing device for making adjustments to the desired lateral offset(s) $O_{desired}$: obstacles that are on the other side of the lane biasing interval from the lane boundary of interest (for example, right-side lane boundary for right-hand turns or left-side lane boundary for left-hand turns); and obstacles that are not within a temporal horizon. Operations for making the adjustment to the desired lateral offset(s) $O_{desired}$ may be aborted or otherwise discontinued when the obstacle is a moving object traveling faster than a threshold speed and on the same side of the lane biasing interval as the reference path.

In 1208, a final lateral offset $O_{final}$ is generated for each index point (for example, index point 1310 of FIG. 12) in the lane biasing interval (for example, lane biasing interval 1308 of FIG. 13). The final lateral offset can be generated by: selecting the desired lateral offset with the smallest value of all desired lateral offsets (for example, desired lateral offset $d_2$ of a given set of desired lateral offsets $d_1, \ldots, d_n$); and setting the final lateral offset $O_{final}$ for all index points in the lane biasing interval equal to the selected desired lateral offset (for example, desired lateral offset $d_2$). An illustration is provided in FIG. 15 that is useful for understanding this process. Alternatively, the final lateral offset $O_{final}$ can be generated using a ramp filter to filter the lateral offsets away from an end of the lane biasing interval. Any known or to be known ramp filter can be used here. The ramp filter may be configured to only allow the lateral offset to become smaller moving away from the corner entrance. The slope may be set to a configured parameter. An illustration is provided in FIG. 16 that is useful for understanding the ramp filter operations.

The validity of each final lateral offset $O_{final}$ is then checked in 1210. An illustration is provided in FIG. 17 that is useful for understanding the validity check. The final lateral offset $O_{final}$ for a right-hand turn should be negative (for example, reside on the right side of the reference path 1700 of FIG. 17) and for a left-hand turn should be positive (for example, reside on the left side of the reference path 1700 of FIG. 17). Thus, this validity check involves comparison operations. A conclusion is made that the final lateral offset is valid when its sign is correct. A conclusion is made that the final lateral offset is invalid when its sign is incorrect.

The invalid final lateral offsets may be optionally discarded or modified in 1212. For example, a final lateral offset for a right-hand turn will be discarded or modified when it is positive (for example, resides on the left or top side of 1700 of FIG. 17). A final lateral offset for a left-hand turn will be discarded or modified when it is negative (for example, reside on the right or bottom side of the reference path 1700 of FIG. 17). The amount to which a lateral offset value is modified can be selected in accordance with a given algorithm or such that the sign of the lateral offset changes from an incorrect sign to a correct sign. The present solution is not limited to the particulars of this example.

Lane Split and Variable Lane Width Scenarios

For lane split or variable lane width scenarios (for example, narrowing lane scenarios), the desired lateral offset is calculated in 516 of FIG. 5 by the computing device in accordance with the process shown in FIGS. 18-21. This process involves: (1804) computing a distance d between index points (for example, index points 1908 of FIG. 19) of a portion of the reference path (for example, reference path 1906 of FIG. 19) located within the post-lane biasing interval (for example, post-lane biasing interval 1904 of FIG. 19) and points (for example, points 1910 of FIG. 19) on the lane bias side boundary (for example, boundary 1912 of FIG. 19); and (1806) identifying lateral offset values that ensure the vehicle will remain at the computed distance from the lane bias side boundary throughout the lane biasing interval. The lateral offset values identified in 1806 have values that ensures the distance d from the lane boundary mark/line will be persisted through the lane biasing interval (for example, lane biasing interval 1902 of FIG. 19).

Figure 20:
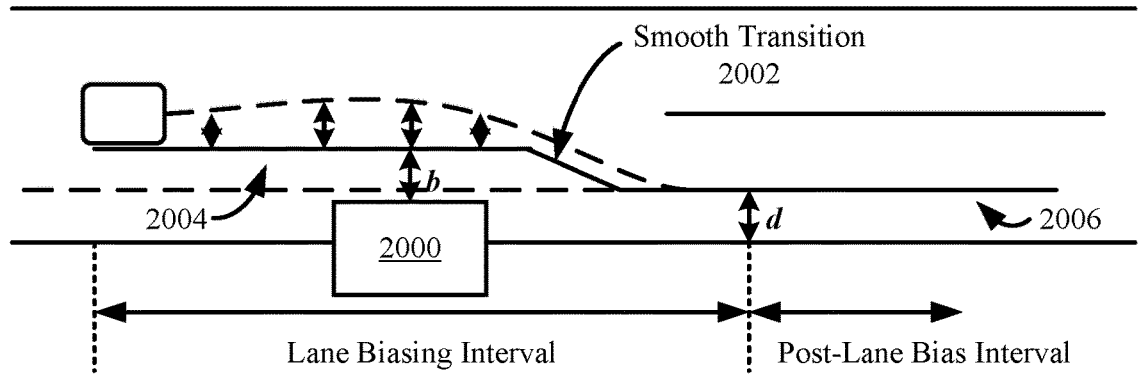
Figure 21:
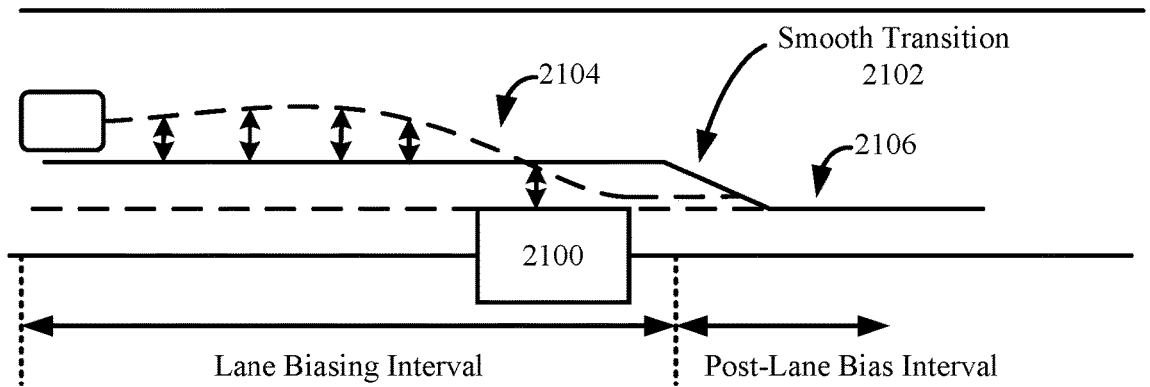

The lateral offset values may be adjusted in 1808 to ensure that (i) the vehicle remains a buffered distance b from any obstacles (for example, obstacle 2000 of FIG. 20 or obstacle 2100 of FIG. 21) and (ii) there is a smooth transition (for example, smooth transition 2002 of FIG. 20 or smooth transition 2102 of FIG. 21) between a portion of the path with the adjusted lateral offset (for example, portion 2004 of FIG. 20 or portion 2104 of FIG. 21) and the portion of the path with the unadjusted lateral offset (for example, portion 2006 of FIG. 20 or portion 2106 of FIG. 21).

Referring again to FIG. 5, method 500 continues with 518 where the computing device assigns weight value(s) to the lateral offset(s). These operations are the same for turn scenarios, lane split scenarios and variable lane width scenarios. These operations can involve: assigning a first pre-defined weight value to final lateral offset values associated with index points of the portion of the reference path which resides in the pre-lane biasing interval; assigning a second pre-defined weight value to lateral offset values associated with index points of the portion of the reference path which resides in the lane biasing interval; and assigning a third pre-defined weight value to lateral offset values associated with index points of the portion of the reference path which resides in the post-lane biasing interval.

Figure 22:
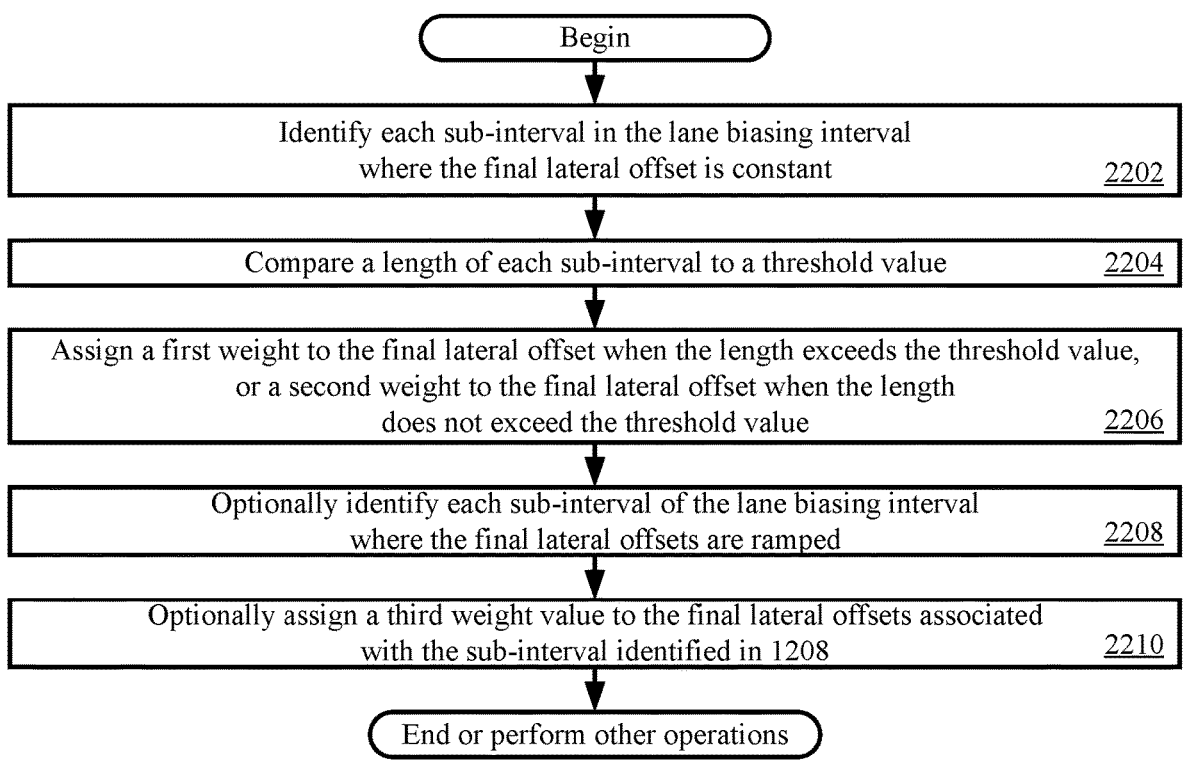
FIG. 22 provides a flow diagram for an illustrative method for assigning weight value(s) to lateral offset(s).
Figure 23:
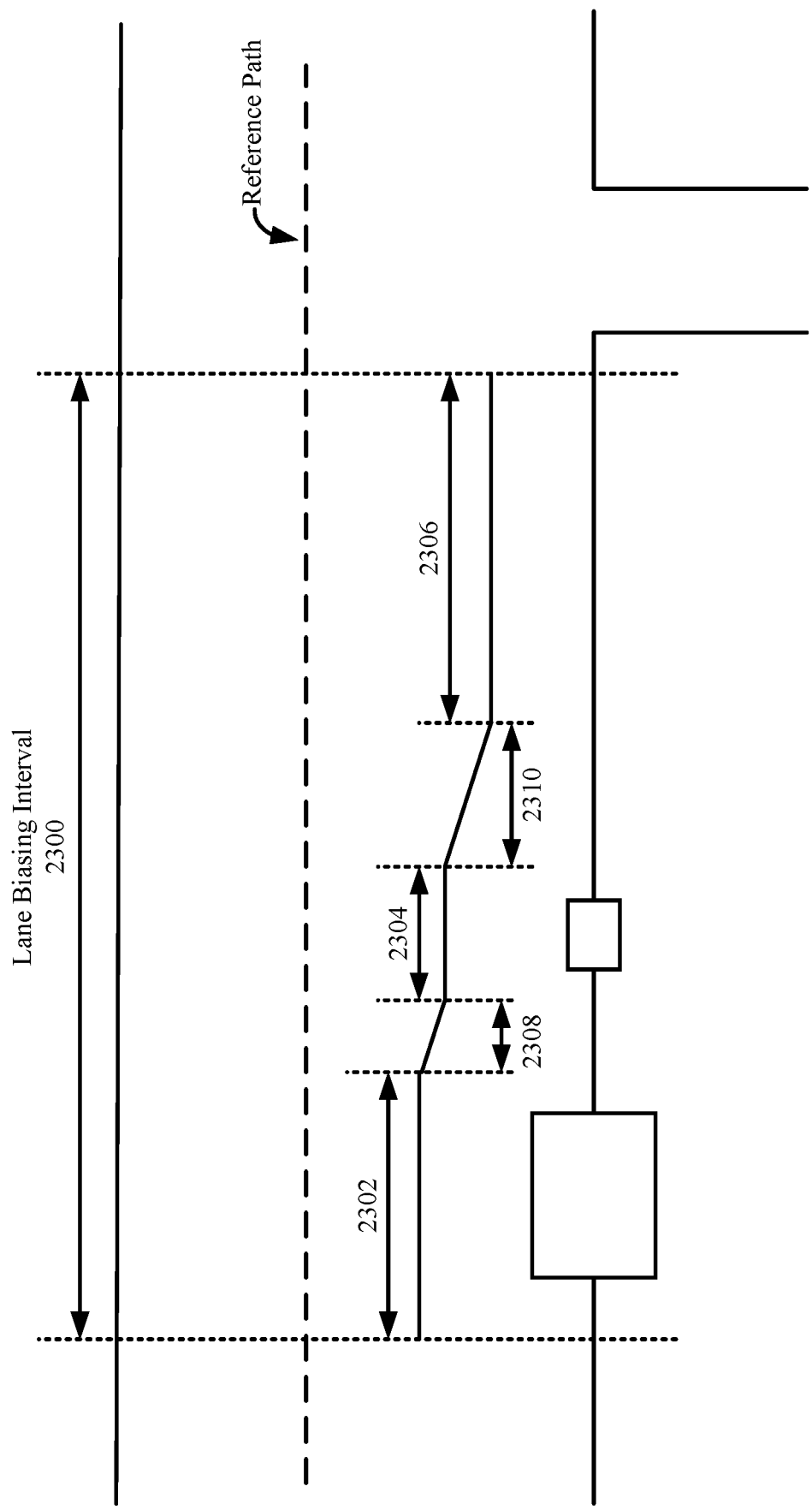
FIG. 23 provides an illustration that is useful for understanding how weights may be assigned to lateral offset(s).

Alternatively, the weight assignment operations can involve the operations 2202-2206 shown in FIG. 22: identifying each sub-interval (for example, sub-intervals 2302, 2304, 2306 of FIG. 23) in the lane biasing interval (for example, lane biasing interval 2300 of FIG. 23) where the final lateral offset is constant; comparing a length of each identified sub-interval to a threshold value thr; assigning a first weight value (for example, a high weight value) to the final lateral offset when the length of the identified sub-interval exceeds the threshold value thr; and assigning a second weight value (for example, a low weight value) to the final lateral offset when the length of the identified sub-interval does not exceed the threshold value thr. The weight assignment operations can also optionally involve the operations of 2208-1210: identifying each sub-interval (for example, sub-intervals 2308, 2310 of FIG. 23) where the final lateral offsets are ramped (i.e., continuously decreasing or increasing in value); and assigning a third weight value (for example, a relatively small weight value) to the final lateral offsets that are associated with the identified sub-interval(s).

Figure 24:
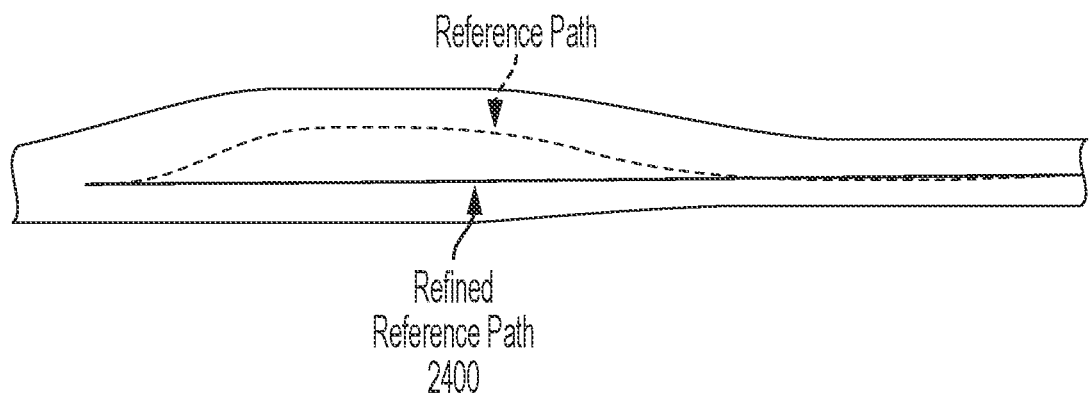
FIGS. 24-26 each provides an illustration of an illustrative refined reference path.
Figure 25:
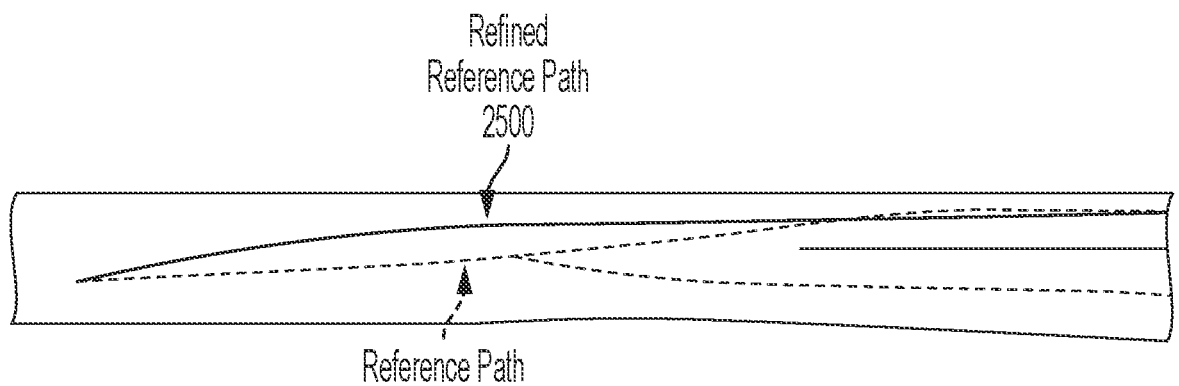
Figure 26:
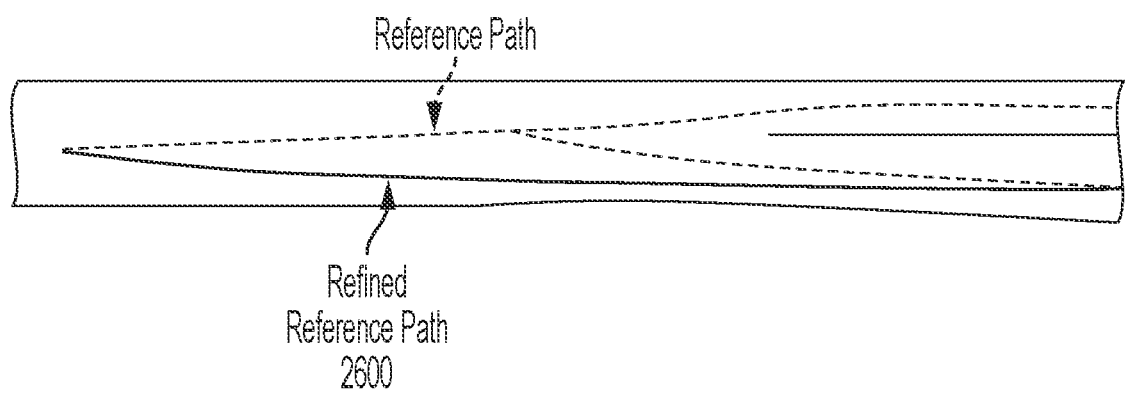

Subsequently, the final lateral offsets, weights and reference path are used in 520 to generate a refined reference path of travel for the vehicle. Illustrative refined reference paths 2400, 2500, 2600 are shown in FIGS. 24-26. The refined reference path of travel is used in 522 to adjust a trajectory for the vehicle. In 524, the vehicle is caused to follow the adjusted trajectory in a real-world environment. Subsequently, 526 is performed where method 500 ends or other operations are performed (for example, return to 502).

As evident from the above discussion, the present disclosure concerns implementing systems and methods for biasing a trajectory of a vehicle. The methods comprise: identifying a lane biasing interval of a lane in which the vehicle is to travel based on a lane width; obtaining a reference path of travel for the vehicle that passes through the lane biasing interval; computing a lateral offset from each index point of the reference path that resides in the lane biasing interval; assigning weights to the lateral offsets; generating a refined reference path of travel for the vehicle using the lateral offsets, weights and reference path of travel for the vehicle; adjusting the trajectory of the vehicle using the refined reference path of travel; and/or causing the vehicle to follow the trajectory which has been adjusted.

In some scenarios, the lane biasing interval may be adjusted based on road geometry. The lane biasing interval may be identified when the lane is classified as a wide lane rather than a narrow lane. The lane biasing interval may be part of the lane prior to a turn, a lane split or a lane width variation. The lane biasing interval can have: a length set to a calibration parameter; an end located a calibratable distance from a start of a turn defined by corner constraints, a start of a width change in the lane, or a start of a lane split; a pre-lane biasing interval in which a lateral offset is set to zero or a small value; and a post-lane biasing interval in which a lateral offset weight is set to zero or a small value.

In those or other scenarios, the lateral offset is computed by: computing a plurality of desired lateral offsets, each said desired lateral offset corresponding to a distance between a respective index point of the reference path and a buffer object residing a first buffered distance from a boundary line of the lane; and obtaining a final lateral offset for each index point of the reference path that resides in the lane biasing interval by setting each desired lateral offset associated with the lane biasing interval to a closest one of the plurality of desired lateral offsets or by filtering the desired lateral offsets associated with the lane biasing interval. The first buffered distance is set to a first value when a shoulder or bike lane exists prior to a turn on which the vehicle can drive, and a second different value when no shoulders or bike lanes exit prior to the turn. The desired lateral offset may be adjusted such that the buffered object is a second buffered distance from an obstacle. The obstacle can include an obstacle other than an obstacle that is on a side of the lane which is opposite to a side of the lane comprising a turn and an obstacle outside of a temporal horizon. The adjustment of the desired lateral offset may be aborted or discontinued when the obstacle is a moving object traveling faster than a threshold speed on a given side of the lane biasing interval. A validity check for the final lateral offset may be performed. The final lateral offset may be discarded or modified based on a result of the validity check.

In those or other scenarios, the lateral offset is computed by: computing a distance between index points of a portion of the reference path located within a post-lane biasing interval of the lane and points on a boundary line of the lane; and identifying lateral offset values that ensure the vehicle will remain at the computed distance from the boundary line of the lane throughout the lane biasing interval. The lateral offset values may be adjusted to ensure that the vehicle will remain a buffered distance from any obstacles and that there is a smooth transition between a portion of the reference path with adjusted lateral offset values and a portion of the reference path with unadjusted lateral offset values.

In those or other scenarios, the weights are assigned to the lateral offsets by: assigning a first weight value to lateral offset values associated with index points of a portion of the reference path which resides in a pre-lane biasing interval; assigning a second weight value to lateral offset values associated with index points of a portion of the reference path which resides in the lane biasing interval; and assigning a third weight value to lateral offset values associated with index points of a portion of the reference path which resides in a post-lane biasing interval. Alternatively, the weights are assigned to the lateral offsets by: identifying each sub-interval in the lane biasing interval where the lateral offset is constant; comparing a length of each identified sub-interval to a threshold value; assigning a first weight value to the lateral offset when a length of the identified sub-interval exceeds the threshold value; and assigning a second weight value to the lateral offset when the length of the identified sub-interval does not exceed the threshold value. The weights may additionally be assigned to the lateral offsets by: identifying each sub-interval of the lane biasing interval comprising ramped lateral offsets; and assigning a weight value to the ramped lateral offsets.

The implementing systems of the above-described method(s) can comprise: a processor; and a non-transitory computer-readable storage medium comprising programming instructions that are configured to cause the processor to implement a method for operating an automated system. The above-described methods can also be implemented by a computer program product comprising a memory and programming instructions that are configured to cause a processor to perform operations.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments but should be defined only in accordance with the following claims and their equivalents.

What is claimed is:

1. A method for biasing a trajectory of a vehicle, comprising:
   identifying a lane biasing interval of a lane in which the vehicle is to travel based on a lane width;
   obtaining a first reference path of travel for the vehicle that passes through the lane biasing interval;
   obtaining a plurality of lateral offsets by:
      computing a plurality of desired lateral offsets, each said desired lateral offset corresponding to a distance between a respective index point of the first reference path and a buffer object residing a first buffered distance from a boundary line of the lane,
      obtaining a final lateral offset for each index point of the first reference path that resides in the lane biasing interval by setting each desired lateral offset associated with the lane biasing interval to a closest one of the plurality of desired lateral offsets or by filtering the desired lateral off sets associated with the lane biasing interval, and
      performing a validity check for the final lateral offset and discarding or modifying the final lateral offset based on a result of the validity check;
   generating a second reference path of travel for the vehicle using the plurality of lateral offsets and the first reference path of travel for the vehicle;
   adjusting the trajectory of the vehicle using the second reference path of travel.

2. The method according to claim 1, further comprising causing the vehicle to follow the adjusted trajectory.

3. The method according to claim 1, further comprising modifying the lane biasing interval based on road geometry.

4. The method according to claim 1, wherein the lane biasing interval is identified when the lane is classified as a wide lane.

5. The method according to claim 1, wherein the lane biasing interval is part of the lane prior to a turn, a lane split, or a lane width variation.

6. The method according to claim 1, wherein the lane biasing interval has: a length set to a calibration parameter; an end located a calibratable distance from a start of a turn defined by corner constraints, a start of a width change in the lane, or a start of a lane split; a pre-lane biasing interval in which a lateral offset is set to zero or a small value; and a post-lane biasing interval in which a lateral offset weight is set to zero or a small value.

7. The method according to claim 1, wherein the first buffered distance is set to a first value when a shoulder or bike lane exists prior to a turn on which the vehicle can drive, and a second different value when no shoulders or bike lanes exit prior to the turn.

8. The method according to claim 1, further comprising adjusting the desired lateral offset such that the buffered object is a second buffered distance from an obstacle.

9. The method according to claim 8, wherein the obstacle comprises an obstacle other than an obstacle that is on a side of the lane which is opposite to a side of the lane comprising a turn and an obstacle outside of a temporal horizon.

10. The method according to claim 8, wherein the adjusting is discontinued when the obstacle is a moving object traveling faster than a threshold speed on a given side of the lane biasing interval.

11. The method according to claim 1, wherein the lateral offset is computed by:

computing a distance between index points of a portion of the reference path located within a post-lane biasing interval of the lane and points on a boundary line of the lane; and identifying lateral offset values that ensure the vehicle will remain at the computed distance from the boundary line of the lane throughout the lane biasing interval.

12. The method according to claim 11, further comprising adjusting the lateral offset values to ensure that the vehicle will remain a buffered distance from any obstacles and that there is a smooth transition between a portion of the reference path with adjusted lateral offset values and a portion of the reference path with unadjusted lateral offset values.

13. The method according to claim 1, further comprising computing each of the plurality of lateral offsets from each index point of the reference path that resides in the lane biasing interval, and assigning weights to the lateral offsets, wherein the second reference path is generated additionally using the weights.

14. The method according to claim 13, wherein the weights are assigned to the lateral offsets by:
assigning a first weight value to lateral offset values associated with index points of a portion of the reference path which resides in a pre-lane biasing interval;
assigning a second weight value to lateral offset values associated with index points of a portion of the reference path which resides in the lane biasing interval; and
assigning a third weight value to lateral offset values associated with index points of a portion of the reference path which resides in a post-lane biasing interval.

15. The method according to claim 13, wherein the weights are assigned to the lateral offsets by:
identifying each sub-interval in the lane biasing interval where the lateral offset is constant;
comparing a length of each identified sub-interval to a threshold value;
assigning a first weight value to the lateral offset when a length of the identified sub-interval exceeds the threshold value; and
assigning a second weight value to the lateral offset when the length of the identified sub-interval does not exceed the threshold value.

16. The method according to claim 13, wherein the weights are assigned to the lateral offsets by: identifying each sub-interval of the lane biasing interval comprising ramped lateral offsets; and assigning a weight value to the ramped lateral offsets.

17. A system, comprising:
a processor;
a non-transitory computer-readable storage medium comprising programming instructions that are configured to cause the processor to implement a method for biasing a trajectory of a vehicle, wherein the programming instructions comprise instructions to:

identify a lane biasing interval of a lane in which the vehicle is to travel based on a lane width;
obtain a first reference path of travel for the vehicle that passes through the lane biasing interval;
compute each lateral offset among a plurality of lateral offsets from each index point of the first reference path that resides in the lane biasing interval;
assign weights to the lateral offsets by:
identifying each sub-interval in the lane biasing interval where the lateral offset is constant,
comparing a length of each identified sub-interval to a threshold value,
assigning a first weight value to the lateral offset when a length of the identified sub-interval exceeds the threshold value, and
assigning a second weight value to the lateral offset when the length of the identified sub-interval does not exceed the threshold value;
generate a second reference path of travel for the vehicle using the plurality of lateral offsets and the first reference path of travel for the vehicle, the second reference path is generated using the weight; and
adjust the trajectory of the vehicle using the second reference path of travel.

18. The system according to claim 17, wherein the programming instructions further comprise instructions to cause the vehicle to follow the trajectory which has been adjusted.

19. A non-transitory computer-readable medium that stores instructions that is configured to, when executed by at least one computing device, cause the at least one computing device to perform operations comprising:
identifying a lane biasing interval of a lane in which a vehicle is to travel based on a lane width;
obtaining a first reference path of travel for the vehicle that passes through the lane biasing interval;
computing each lateral offset of a plurality of lateral offsets from each index point of the first reference path that resides in the lane biasing interval;
assigning weights to the lateral offsets by:
identifying each sub-interval of the lane biasing interval comprising ramped lateral offsets, and
assigning a weight value to the ramped lateral offsets;
generating a second reference path of travel for the vehicle using a plurality of lateral offsets and the first reference path of travel for the vehicle, wherein the second reference path is generated using the weights; and
adjusting a trajectory of the vehicle using the refined reference path of travel.

* * * * *